US011421516B2

(12) United States Patent
Bowdon et al.

(10) Patent No.: US 11,421,516 B2
(45) Date of Patent: Aug. 23, 2022

(54) GEOTHERMAL POWER GENERATION

(71) Applicant: SICL-G, LLC, Addison, TX (US)

(72) Inventors: Kenneth Bowdon, Dallas, TX (US); A. Judson Hill, Rockville, MD (US); David Rounds, Forney, TX (US)

(73) Assignee: SIGL-G, LLC, Addison, TX (US)

( * ) Notice: Subject to any disclaimer, the term of this patent is extended or adjusted under 35 U.S.C. 154(b) by 0 days.

(21) Appl. No.: 16/864,081

(22) Filed: Apr. 30, 2020

(65) Prior Publication Data

US 2020/0347707 A1   Nov. 5, 2020

Related U.S. Application Data

(60) Provisional application No. 62/841,111, filed on Apr. 30, 2019.

(51) Int. Cl.
 *E21B 43/16* (2006.01)
 *E21B 43/40* (2006.01)
 *E21B 43/12* (2006.01)
 *F02C 1/05* (2006.01)

(52) U.S. Cl.
 CPC .......... *E21B 43/164* (2013.01); *E21B 43/121* (2013.01); *E21B 43/40* (2013.01); *F02C 1/05* (2013.01)

(58) Field of Classification Search
 CPC ..... E21B 43/16; E21B 43/0092; E21B 43/164
 See application file for complete search history.

(56) References Cited

U.S. PATENT DOCUMENTS

| 4,142,108 | A | 2/1979 | Matthews |
| 4,357,801 | A | 11/1982 | Wahl, III |
| 4,576,005 | A | 3/1986 | Force |
| 4,712,380 | A | 12/1987 | Smith |
| 5,400,598 | A | 3/1995 | Moritz et al. |
| 6,539,718 | B2 | 4/2003 | Bronicki et al. |
| 6,668,554 | B1 | 12/2003 | Brown |
| 7,146,823 | B1 | 12/2006 | Wiggs |

(Continued)

FOREIGN PATENT DOCUMENTS

| EP | 2568111 A1 | 3/2013 |
| EP | 2682689 B1 | 12/2015 |

(Continued)

OTHER PUBLICATIONS

"Carbon Dioxide Enhanced Oil Recovery: Untapped Domestic Energy Supply and Long Term Carbon Storage Solution"; National Energy Technology Laboratory (NETL); U.S. Department of Energy; Mar. 2010.

(Continued)

*Primary Examiner* — Kristyn A Hall
(74) *Attorney, Agent, or Firm* — Marc A. Hubbard; Hubbard Law, PLLC

(57) ABSTRACT

An enhanced oil recovery method in which carbon dioxide is injected into a well to pressure the well or add lift a production flow from the well recaptures the injected carbon dioxide for reinjection into the well for lift or into another well in a group of for pressuring the well or adding lift to the production flow from the well. Geothermal energy in the production stream can be converted to electrical power for use in the recapturing of the carbon dioxide or other operations at the well site.

24 Claims, 11 Drawing Sheets

(56) References Cited

U.S. PATENT DOCUMENTS

| | | |
|---|---|---|
| 7,856,839 B2 | 12/2010 | Wiggs |
| 8,297,355 B2 | 10/2012 | Hamilton et al. |
| 8,307,896 B2 | 11/2012 | Sarria |
| 8,375,716 B2 | 2/2013 | Ramaswamy et al. |
| 8,610,303 B2 | 12/2013 | Yocum, Jr. |
| 8,657,011 B2 | 2/2014 | Vyas et al. |
| 8,708,046 B2 | 4/2014 | Montgomery et al. |
| 9,074,794 B2 | 7/2015 | Suryanarayana et al. |
| 9,222,342 B2 | 12/2015 | Balczewski |
| 9,231,267 B2 | 1/2016 | McAlister |
| 9,404,443 B2 | 8/2016 | McAlister |
| 9,803,626 B1 | 10/2017 | Eastman et al. |
| 9,840,429 B2 | 12/2017 | Takahashi et al. |
| 10,053,374 B2 | 8/2018 | Li et al. |
| 10,527,026 B2 | 1/2020 | Muir et al. |
| 10,801,942 B2 | 10/2020 | Ou et al. |
| 2009/0235664 A1 | 9/2009 | Smith |
| 2011/0100002 A1 | 5/2011 | Muir et al. |
| 2011/0138809 A1 | 6/2011 | Ramaswamy et al. |
| 2011/0272166 A1 | 11/2011 | Hunt |
| 2012/0174581 A1 | 7/2012 | Vaughan et al. |
| 2012/0192563 A1 | 8/2012 | Kauffman et al. |
| 2012/0261121 A1 | 10/2012 | Lourenco et al. |
| 2013/0199774 A1* | 8/2013 | Sultenfuss ............ E21B 43/168 166/248 |
| 2014/0130498 A1* | 5/2014 | Randolph ............... E21B 43/24 60/645 |
| 2017/0130703 A1 | 5/2017 | Muir et al. |
| 2017/0370251 A1 | 12/2017 | McGrail et al. |
| 2018/0023805 A1 | 1/2018 | Qin et al. |
| 2018/0135892 A1 | 5/2018 | During |
| 2018/0291880 A1 | 10/2018 | Cairns et al. |
| 2019/0128567 A1 | 5/2019 | Redfern |
| 2019/0346181 A1 | 11/2019 | Toews et al. |

FOREIGN PATENT DOCUMENTS

| | | |
|---|---|---|
| EP | 2649311 B1 | 4/2018 |
| FR | 2881482 A1 | 8/2006 |
| JP | 2013543948 A | 12/2013 |
| WO | 2012068279 A2 | 5/2012 |
| WO | 2017146712 A1 | 8/2017 |
| WO | 2018094338 A1 | 5/2018 |
| WO | 2018152463 A1 | 8/2018 |

OTHER PUBLICATIONS

"U.S. National Electrification Assessment"; Electric Power Research Institute (EPRI); Apr. 2018.

"Would it be economically feasible to install an inline turbine in a gas well or a pipeline and convert the kinetic energy of the flowing gas into electrical energy?"; Quora.com, posted Jul. 2015; retrieved Jun. 29, 2021 at: https://www.quora.com/Would-it-be-economically-feasible-to-install-an-inline-turbine-in-a-gas-well-or-a-pipeline-and-convert-the-kinetic-energy-of-the-flowing-gas-into-electrical-energy.

Adelina P. Davis et al.; "Geothermal power production from abandoned oil wells"; Energy; vol. 34; pp. 866-872; 2009; doi:10.1016/j.energy.2009.03.01.

Alison Auld et al.; "Organic Rankine cycles in waste heat recovery: a comparative study"; International Journal of Low-Carbon Technologies; vol. 8; pp. i9-i18, Jul. 2013; https://doi.org/10.1093/ijlct/ctt033.

B. Todd Hoffman et al.; "Huff-N-Puff Gas Injection Pilot Projects in the Eagle Ford"; SPE Canada Unconventional Resources Conference, Society of Petroleum Engineers; SPE-189816-MS; Mar. 13-14, 2018.

Brian S. Higgins et al.; "Process Modeling of a Closed-Loop sCO2 Geothermal Power Cycle"; The 5th International Supercritical CO2 Power Cycles Symposium; Mar. 29-31, 2016.

Chukwuemeka Aniodoh; "Enhancing Energy Recovery From Abandoned Oil Wells Through Geothermal Technology"; GRC Transactions 2016; vol. 40; pp. 797-800 ; 2016.

Curtis M. Oldenburg et al.; "Numerical Simulation of Critical Factors Controlling Heat Exchange from Geothermal Systems Using a Closed-Loop Heat Exchange Method"; Proceedings, 41st Workshop on Geothermal Reservoir Engineering; Stanford University; SGP-TR-209; Feb. 22-24, 2016.

Don Fox et al.; "The Effect of Well Density on Resource Depletion for a Vertical Closed-Loop sCO2 Geothermal Well System"; GreenFire Energy; Oct. 25, 2016.

Frederick J. Cogswell, Dr.; "An ORC Power Plant Operating on a Low-Temperature (165°F) Geothermal Source"; GRC Transactions; vol. 30; pp. 729-732; 2006.

Grant O. Musgrove et al.; "Tutorial: Heat Exchangers for Supercritical CO2 Power Cycle Applications"; The 4th International Symposium—Supercritical CO2 Power Cycles Sep. 9-10, 2014.

Honggang Wang et al.; "Geothermal Energy Production from Oil/Gas Wells and Application for Building Cooling"; GRC Transactions; vol. 40; pp. 113-120; 2016.

Hussain Al Ramis et al. "Design of New Oil and Gas Wells Fit for Geothermal Applications"; GRC Transactions; vol. 42; 2018.

James J. Sheng; "Optimization of huff-n-puff gas injection in shale oil reservoirs"; Petroleum; vol. 3, Issue 4; 2017; http://dx.doi.org/10.1016/j.petlm.2017.03.004.

Josh Nordquist; "Use of Small, Sub 1 MW Organic Rankine Cycle Power Systems and Low Temperature Resources"; GRC Transactions; vol. 33; pp. 753-758; 2009.

Kai Wang et al.; "Downhole Geothermal Power Generation in Oil and Gas Wells"; GRC Transactions; vol. 41; 2017.

NET Power; "Truly Clean, Cheaper Energy"; Presentation to NGI at Stanford; Oct. 2016.

Nick Snow; "DOE generates electricity from producing well's hot water"; Oil & Gas Journal; Oct. 20, 2008.

Srikanth Thoram et al.; "Extending Shale Gas Well Life with Low Grade Geothermal Power"; GRC Transactions; vol. 35; pp. 553-560; 2011.

Subir K. Sanyal et al.; "Geothermal Power Capacity from Petroleum Wells—Some Case Histories of Assessment"; Proceedings of the World Geothermal Congress 2010; Apr. 25-29, 2010.

Subir K. Sanyal et al.; "Feasibility of Geothermal Power Generation from Petroleum Wells"; GRC Transactions; vol. 33; pp. 673-679; 2009.

Sylvain Quoilin; "An introduction to thermodynamics applied to Organic Rankine Cycles"; STG International; Nov. 2008.

William D. Gosnold et al., "Co-Produced Geothermal Resources and EGS in the Williston Basin"; GRC Transactions; vol. 37; pp. 721-726; 2013.

William Gosnold et al.; "Electric Power Generation from Low to Intermediate Temperature Resources"; U.S. DOE Report No. DE-EE0002854; Mar. 20, 2017; https://doi.org/10.2172/1347216.

Xingbang Meng et al.; "Performance Evaluation of CO2 Huff-n-Puff Gas Injection in Shale Gas Condensate Reservoirs"; Energies; vol. 12, No. 1: 42; 2019; https://doi.org/10.3390/en12010042.

* cited by examiner

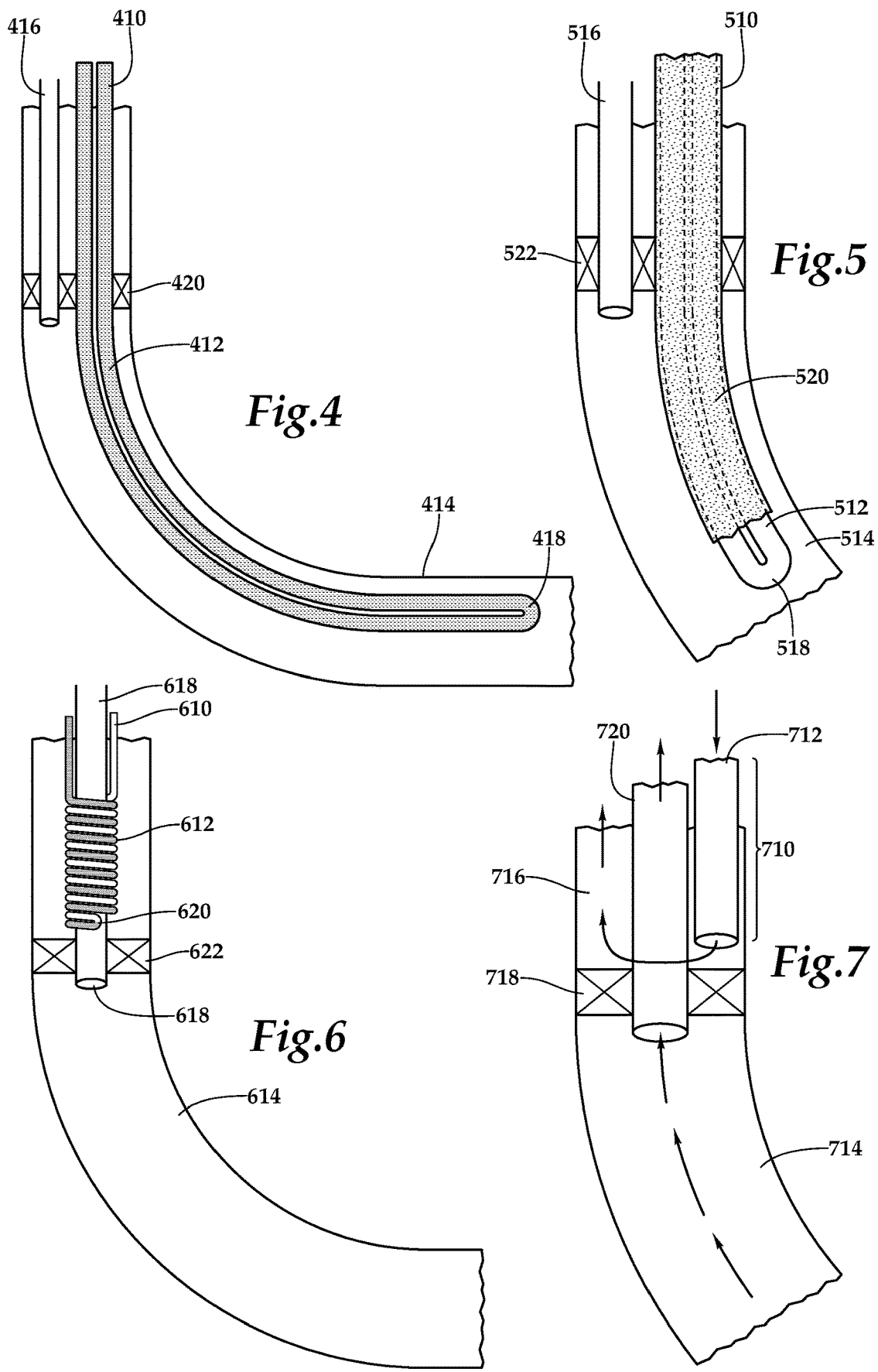

GEOTHERMAL POWER GENERATION

This application claims the benefit of U.S. provisional application 62/841,111 filed Apr. 30, 2019, which is incorporated by reference in its entirety for all purposes.

FIELD OF INVENTION

Systems and methods for extending recovery of oil and gas wells and conversion of geothermal energy.

BACKGROUND

Horizontal drilling and hydraulic fracturing have made recovery of oil and gas from shale formations affordable, ensuring a proven supply of fossil fuel well into the future. Nevertheless, the energy industry has continued to innovate, driving productivity up and cost of extraction down to make oil and gas production economical.

The industry has invested trillions of dollars into infrastructure to extract oil and gas from shale, including hundreds of thousands of horizontal wellbores, pipelines for oil, gas, and water, advancements to the local power grid, pipe, casing, and tubing manufacturing facilities, and human resources resulting in a well trained and experienced workforce.

Successful shale reservoirs must be thermally mature to generate hydrocarbons. The lower limit of the hydrocarbon generation window begins at around 60° C. However, most shale reservoirs are much hotter, with some reservoir temperatures approaching 204° C. Furthermore, development of shale reservoirs requires a close spacing (150 feet to 500 feet apart) of long horizontal wellbores (4,500 to 12,000 feet). The reason is that the shale has high porosity but very low permeability. Micropores within the rock, though filled with hydrocarbons, are very poorly connected. Fracturing the shale creates a network of fractures that increases permeability by connecting the micropores, resulting in a network of pathways that allow the hydrocarbons to flow into the wellbore. The fracturing process affects a relatively small volume of rock, usually about a 50 to 150 feet radius around the wellbore. Wellbores are, therefore, usually drilled close together to fracture a significant volume of a reservoir. The wellbore and the associated fracture network will also tend to enhance the transmission of heat from the shale into the wellbore due to the flow of hydrocarbons and other fluids. A developed shale reservoir thus functions as a large radiator system that transfers heat from the reservoir into the wellbore.

Successful shale reservoirs can be hot enough to allow for conversion of their heat into other forms of energy, such as electricity, using low temperature geothermal (LTG) technology. If a sufficient amount of heat is transferred from the shale to the wellbore, and if the heat can be efficiently recovered from the wellbore, developed shale reservoirs can be a source of geothermal energy sufficient to generate electricity through the use of LTG systems. LTG systems are generally those capable of converting heat from relatively lower temperature heat sources into mechanical work and/or electricity. LTG systems include, but are not limited, to power generators, engines, and turbine systems that convert heat to mechanical work (typically for purposes of turning a generator to generate electricity from the mechanical work) using a working fluid that undergoes a phase change according to the Organic Rankin Cycle or Brayton Cycle. Representative examples include ORC generators and Stirling engines, as well as various types of electrothermal devices.

SUMMARY

The following disclosure describes several new or improved methods and systems for enhancing oil recovery from new or existing oil and gas wells using and for capturing geothermal energy from oil and gas wells, particularly those in shale formations.

Each method and system can be used by itself or with one or more of the other methods for capturing and using the geothermal energy for powering equipment and the well site for operations and the well site, including, for example, extended oil recovery, as well as generating excess energy for sale back to the power grid. Two or more of the different methods could also be used at different stages in the life cycle of a well.

Several of the methods are used with producing hydrocarbon wells, but some of the methods may be used or adapted for use with wells drilled for exploration but never completed or put into production and wells that were once producing but are no longer producing or are plugged.

Adding equipment for performing one or more of these methods to new or currently producing hydrocarbon wells might add to the profitability for the well and make it possible for it to continue to produce hydrocarbons beyond economic limits that would not exist without it, thus increasing the total hydrocarbon recovery from a well resulting in a longer economic use of the installed infrastructure.

A production pad most often has 4 to 8 wells, and the land use within these units is typically 2 to 4 acres. Production facilities are typically centralized within the unit. Equipment for recovering and/or making use of the geothermal energy, including power generation, is, optionally, placed at one location and made use of by multiple wellbores and production flows from them (if still producing).

Once all of the hydrocarbons have been depleted, the wellbore and the surface equipment could, optionally, continue to be used to generate electrical power and possibly do so profitably.

BRIEF DESCRIPTION OF DRAWINGS

FIG. 4 depicts schematically another embodiment of a heat exchanger for a geothermal energy capture system an oil and gas well.

FIG. 5 depicts another embodiment of a heat exchanger of a geothermal energy capture system for an oil and gas well.

FIG. 6 depicts one embodiment of a heat exchanger of a geothermal energy capture system for an oil and gas well.

FIG. 7 depicts one embodiment a heat exchanger of a geothermal energy capture system for an oil and gas well.

DETAILED DESCRIPTION

Figure 1:
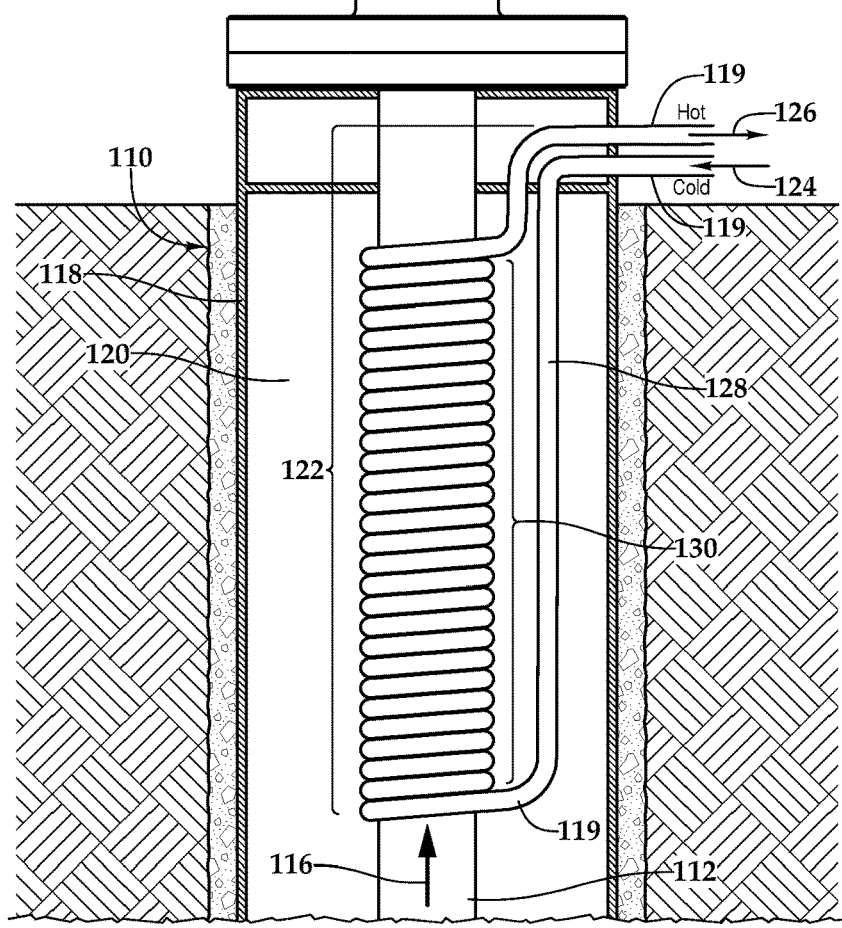
FIG. 1 is a schematic representation of an embodiment of a heat exchanger portion of a geothermal energy capture system for an oil and gas well.

Referring now to FIGS. 1 to 8, described are various examples of methods and apparatus for capturing geothermal energy from a production stream from an oil and gas well and from a non-producing oil and gas wells.

In a first example a production stream, which typically comprises a mixture of hydrocarbons (oil and gas) and water used to fracture the well, is transferred to a low temperature geothermal (LTG) system in one or more of several different ways.

During initial production heat can be extracted directly from the produced hydrocarbon and water stream to generate electricity using an LTG system. In other embodiments, the flow back water is, optionally, remediated utilizing the geothermal electric generation and is, optionally, recirculated back into the wellbore through a variety of methods to be reheated and used again. The reclaimed water, rather than having to be disposed of using injection wells or cleaned using other methods, can be used as a transfer fluid in a closed loop. Use of the reclaimed water as a transfer fluid comprises circulating the reclaimed water into the wellbore for reheating using a closed system. The water is, optionally, recirculated using a closed loop. Once the flow of hydrocarbons produced by a well falls below economic limits, a process of back and forth floods can be used to enhance production and continue bringing heat to the surface for power generation.

The heat from the formation may be transferred in one of several methods described below. Two or more of these methods can also be used in combination to cover, for example, the entire life cycle of a well. The descriptions of the methods below are non-limiting examples and can be modified.

In one example of one of the methods, if the temperature of the production stream at the surface exceeds 60° C., the production stream including oil, gas and water mixture is passed through the boiler of the ORC generator that acts as a heat exchanger to transfer heat to a working fluid with the ORC generator to heat a working fluid to supercritical state. Electricity generated from this first pass is, optionally, used to power oil field operations employed in a conventional process for producing and separating the oil and water and to remediate produced water. The electricity is, optionally, also sold to the power grid. After remediation, the water may, optionally, be circulated or recirculated through the wellbore through one or more of the methods described below.

Representative examples of transfer fluids include fluids containing water, oil, hot air, liquid ammonia ($CH_4$), or carbon dioxide ($CO_2$). Representative examples of working fluids used in ORC generators and other LTG generators and equipment include fluids that contain refrigerants, liquid ammonia, carbon dioxide, or heavy hydrocarbons such as butane, propane, and pentane.

A second method can be utilized when the temperature of the production stream after gas separation is less than 60° C. but the production stream in the well below the wellhead is greater than 60° C. In this method, the heat is transferred from the production tubing, which should be greater than 60° C., directly to the working fluid of an LTG system, such as an ORC generator. A well is typically constructed with production tubing inside a cased hole. The production tubing carries the production stream to the surface. In one example of this method, a supply line carrying the working fluid of the LTG system extends from the LTG system, through the wellhead, and then down the hole parallel to the production tubing down, where it connects with a heat exchanger at a distance needed for the working fluid to acquire sufficient heat from the produced well fluids. This distance will typically be several stands or sections of production tubing below the wellhead. The heat exchanger transfers heat from the production tubing, through which the production fluids flow, to the working fluid that is flowing through the heat exchanger toward the surface. The other end of the heat exchanger is connected to a return line that carries the heated working fluid to the LTG system, where the heat is converted to mechanical work and/or electrical power. The cooler working fluid is then recirculated back to the heat exchanger through the supply line. A closed recirculation is thus formed.

One, non-limiting example of a heat exchanger comprises tubing smaller than the production tubing that wraps around the outside of or is incorporated into the wall of the production tubing. The heat exchanger is part of a closed loop through which the working fluid is recirculated. In one embodiment, the heat exchanger has a connection at a lower end for connecting to a supply line that carries the working fluid from the LTG system. The heat exchanger may, optionally, have another connection at an upper end of the heat exchanger for connecting to a return line that carries working fluid from the heat exchanger to the LTG system. Each of the supply or return lines can be a single length or multiple lengths of tubing or pipe connected (including possibly through various other components or equipment) to form a conduit through which the working fluid flows between the heat exchanger and the LTG system. Alternatively, both the supply and return lines can be part of the heat exchanger, for example as a continuous tube or pipe (which could be made from a single length of tubing or multiple lengths connected together), with a connection for one or both of the return and supply lines made at some point above the heat exchanger.

Another example of a heat exchanger comprises a double walled and baffled tubing string encasing the production string.

The length of time the working fluid should be in contact with the production tubing to transfer heat from the production effluent, through the production tubing, to the working fluid for it to reach suitable temperature, depends in part on the production flow rate, the heat transmission properties of the tubing, and the properties of the working fluid. The heat exchanger would, in one embodiment, be configured based on an assumed or predicted minimum production flow rate during at least the period when the LTG system is expected or desired to be used. The configuration that is selected or chosen would bring the organic working fluid to a suitable temperature at the assumed or predicted minimum production flow rate.

Optionally, the production tubing is at least partially, or entirely, insulated along its length from a production packer to the heat exchanger to reduce heat loss.

A third method may be utilized if the production flow rate of initial production is insufficient to transfer sufficient heat to the working fluid. In this method, a double string of tubing is run inside the production casing through the horizontal section to the toe of the well. The end of the inner tubing is open. The end of the outer tubing string is closed. It can be closed with a plug or with a sliding sleeve at the toe of the string for later use. The production stream passes up the annulus between the outer tubing and the production casing. A recirculated transfer fluid such as water, carbon dioxide, liquid ammonia or other fluid is pumped down the inner tubing string and circulated back up through the annulus between the inner and outer tubing string to be heated. The transfer fluid is transferred to a working fluid of an LTG system, for example, a boiler of an ORC generator. In one non-limiting example, the outer tubing string is, as an option, insulated from the packer at the wellhead to the top of the build section. In another non-limiting example, a fluid other than water may be used as the transfer fluid.

A fourth method can be practiced using a well with the same or similar configuration as the well in the third method except the working fluid for the LTG generator is recirculated through the system rather than a transfer fluid.

A fifth method can be used when the primary oil and gas production rate declines below the ability to transfer sufficient heat to operate the LTG system. If a double string of tubing such as described in the third method has already been run, the inner tubing can be pulled, and a sleeve opened in the outer tubing string. Otherwise, a string of tubing can be run. Carbon dioxide is then pumped down the production tubing to act as both a gas lift and to enhance oil production. The temperature of the returning fluid should be kept above 175 degrees to prevent corrosion. The carbon dioxide is heated as it returns to the surface. The carbon dioxide along with production fluid is passed through a heat exchanger of the LTG system to heat the working fluid. Then the carbon dioxide, natural gas, and produced fluids are separated. The carbon dioxide is compressed and recirculated back down the wellbore to be reheated. Thus, creating a closed loop system.

Each of the third, fourth and fifth methods could also be used or adapted to be used with a previously existing hydrocarbon well that has been plugged, shut-in, or is not otherwise not producing.

A sixth method referred to herein as a carbon dioxide "back and forth" flood, modifies a known production stimulation method using carbon dioxide known as the "huff and puff" method. This method is used to decrease the viscosity of the oil and expand the size of the oil molecule, which forces oil out of the micropores of the shale thereby improving flow rates and increasing the ultimate recovery of a wellbore.

Once a well or group of wells have declined to levels near or below the economic limit for hydrocarbon production, the well can be prepared to be used for this method. In one example, a wellbore (or a group of wellbores)—Well A—is paired with at least one other wellbore or group of wellbores—Well B.

Carbon dioxide would be injected (the "huff") into Well A through an outer production tubing in the well with the sliding sleeve open (and/or the annulus if that volume is required for the flood) to bring the reservoir past the minimum miscible pressure for carbon dioxide and close to original reservoir pressure. Once a max pressure is attained, a rest or shut-in period is required to allow the carbon dioxide to become miscible with the oil in the reservoir. The well is then flowed back (the "puff") to production. The temperatures throughout the production side of the cycle are, in one embodiment, kept above 175 degrees F. to prevent corrosion issues that may occur if there is any water in the production stream. The liquid phase (oil and water) in the production stream is separated from the gaseous phase (carbon dioxide and natural gas) while maintaining the pressure. The hot liquid stream supplies heat to an LTG generator (such as by passing the stream through a boiler to transfer heat directly to the working fluid in the LTG generator). The carbon dioxide and natural gas stream at a supercritical temperature and pressure can be, for example, run through a membrane separator with the carbon dioxide running directly through either a carbon dioxide cycle generator (Brayton Cycle, thermal oxidizer, or other cycle) or ORC generator. The separated natural gas is transported from the site for sale. The carbon dioxide (after going through the ORC's condenser) is then compressed down Well B until, for example, the bottom hole pressure in Well A is either depleted or below the minimum miscible pressure. Additional carbon dioxide can, if necessary, be added to bring Well B to a pressure exceeding the minimum miscible pressure and close to original reservoir pressure. The production stream from Well B is handled or treated like the production stream from Well A was handled. The flow of carbon dioxide is then reversed, flowing from Well B to Well A. This method is capable of enhancing oil production while at the same time generating electricity to power the process, with excess electrical power optionally being used for oil field operations or sold downstream. The electricity can also be used to capture carbon dioxide and reduce the need to purchase and transport carbon dioxide to the well sites. The method is not limited to use with just two wells or groups of wells. It could be used with clusters of three or more wells and more than two groups, each group having multiple wells.

One example of this back-and-forth flood or modified huff and puff method comprises any two or more of the following steps:

First, inject carbon dioxide into a Well Group A to bring formation pressure back past minimum miscible pressure (MMP) for carbon dioxide and continue until pressure is near initial reservoir pressure (IRP). As used herein, near initial reserve pressure is preferably 80 percent of the initial reservoir pressure and more preferably 90 percent of the initial reserve pressure, and even more preferably 95 percent of the initial reserve pressure. Minimum miscible pressure in general and as used herein is the minimum pressure at which carbon dioxide, or other transfer fluid, mixes with, as opposed to merely dissolving in, residual oil deposits. Any industry accepted definition of MMP may also be used for defining MMP as described herein. For example, MMP has been defined as the pressure at which more than 80 percent of oil in place is recovered at carbon dioxide breakthrough and has been defined as an oil recovery of at least 90 percent at 1.2 hydrocarbon pore volume of carbon dioxide injected.

Second, soak for an appropriate time.

Third, flow back from Well Group A.

Fourth, separate hydrocarbons (oil and/or gas) and carbon dioxide. Oil is separated and transported from the well site for sale. Carbon dioxide and the natural gas are then passed through one or more membranes to separate the gas for transport. The carbon dioxide is then passed through an LTG generator.

Fifth, after carbon dioxide flows through the ORC, inject it, into the depleted Well B Group until the pressure equalizes, adding compression to bring Well B Group up to IRP and perform step 3 for Well Group B.

Fifth, as Well A Group depletes to near MMP, the carbon dioxide recovered from Well B can be flowed back to Well A and the cycle repeated. Once oil and gas production stops, the cycle can continue for as long as the infrastructure remains good—probably for decades—and thus continue to produce electric power and residual hydrocarbons.

Each group of wells includes one or more wells. In a preferred embodiment, each group includes a plurality of wells. In the flow back phase of this method, the sleeve could be shut in an outer production tubing if flowing volume needs to be reduced to conserve pressure allowing the well to flow only in the annulus. When the production rate of the primary stream of oil, gas, and carbon dioxide falls below sustainable levels, the sleeve in the outer production tubing could be opened, and carbon dioxide could be pumped down the outer production tubing with the sleeve open into the toe of the well to provide gas lift and enhanced oil recovery.

Optionally, once rates fall below the minimum level the sleeve is closed in the outer string, and an inner string is run as in method three. Production would continue up the annulus between the production casing and the outer tubing while carbon dioxide is simultaneously circulated down through the inner tubing and circulated back up between the annulus between the outer tubing and the inner tubing to maintain sufficient volumes for the LTG generator. The electricity that is generated by an LTG generator using any of the foregoing methods can be used in several different ways. In one example, the electricity is used to power motors, pumps, compressors, heaters, hydraulic systems, batteries, charging stations and other equipment used at or in the vicinity of the well site for various activities in connection with developing the shale reservoir, including drilling, production, treatment, transmission, and stimulation. The electric power that is generated can, once the cost of adapting the well for power generation is recouped, make these processes more economical by, for example, reducing the need for the use of diesel as the primary fuel for drilling rigs and other equipment in remote areas. In another example, electrical power that is generated is flowed back to the electrical grid. Several developed shale reservoirs are near towns and cities near an electrical grid that services large numbers of consumers of electrical power. The electricity can also be used to power both on-site needs and sold to the power grid.

Other possible advantages or benefits that could be achieved from one or more of these methods include one or more of the following, First, the cost of drilling wells is about ⅓ to ¾ of the cost of building a conventional geothermal power generation facility. By taking advantage of wells that are already drilled, these methods of generating geothermal power lower the cost of geothermal energy production.

Second, oil can be produced more efficiently by extracting heat to produce electricity that can be used in the drilling and production processes or sold for other uses.

Third, later in the production cycle, water can be injected into alternate wellbores to transfer heat, producing more oil.

Fourth, depending on the method, it may eliminate or reduce the need for saltwater disposal wells.

Fifth, the profitability of a producing well can be increased and provide continued revenue from well when it would otherwise be depleted.

Sixth, it would delay or eliminate plugging costs by delaying or never needing to plug a well.

Seventh, the injection of carbon dioxide into wellbores could reduce or counter the carbon footprint of hydrocarbon energy use.

Reference is now made to FIG. 1, which depicts an example of an embodiment of a heat exchanger portion located within a wellbore for transferring heat from production stream to an LTG generator. Production tubing 112 is located within wellbore 110 and continues down wellbore 110. At the surface is a well head 114. Oil or gas flows upward through production tubing 112 as indicated by production flow arrow 116. Production flow continues upward through production tubing 112 and exits the wellhead 114 for further treatment. Wellbore 110 in this embodiment has a casing 118 that continues downward, into the formation, along at least a portion of wellbore 110. In practice, the well bore may have multiple concentric casings and/or liners and more than one production string. The figure is not intended to imply any particular completion. However, there would need to be sufficient room between the outer diameter of production tubing 112 and the inner diameter of the casing surrounding it to run tubing 119 an annulus 120 formed between the production tubing 112 and the casing. This tubing has a smaller diameter. In this embodiment, tubing 119 for a transfer fluid or working fluid is run into the annulus and wrapped or coiled around production tubing 112 to form a heat exchanger 122. In practice, tubing 119 may have segments that connect to connection points to each end of the heat exchanger 122 and to connection points at the surface. The figure is intended to be schematic and generalized and tubing 119 is intended to represent a loop through which a transfer or working fluid may be circulated downhole to a heat exchanger. In this embodiment a transfer fluid is circulated through heat exchanger 122 as indicated by input flow arrow 124 and output flow arrow 126. The transfer fluid transfers heat to an LTE unit (not shown). However, in another embodiment, a working fluid of an LTG unit could also be circulated through the heat exchanger Transfer fluid flows into heat exchanger 122 as indicated by input flow arrow 124. Transfer fluid continues to flow down the linear portion 128 of heat exchanger 122, which delivers the transfer fluid to a downhole end of heat exchanger 122. At this point the transfer fluid flows into the coiled portion 130 of heat exchanger 122. Transfer fluid continues to flow through coiled portion 130 of heat exchanger 122 in the uphole direction until it reaches the surface at which point the transfer fluid flows as indicated by output flow arrow 126 to the remainder of a geothermal capture system (not shown). Once the transfer fluid is processed through the remainder of the geothermal energy capture system, it is returned to heat exchanger 122 as indicated by input flow arrow 124.

Production flow passing through production tubing 112 originates downhole where formation temperatures are relatively hotter than surface temperatures. The product flow is therefore relatively hot where it originates but tends to cool as it comes closer to the surface. When it reaches the surface, the production stream is at its coolest. Locating a heat exchanger downhole allows more heat to be extracted from the production flow.

Thermal energy in the production flow heats production tubing 112, which then transfers the heat to the fluid within the tubing and cooling the production flow. As transfer fluid enters into heat exchanger 122 at flow arrow 124, the transfer fluid is at lower temperature than the temperature of the production fluid flowing through production tubing 112. However, as the transfer fluid flows into and through coiled portion 130, the thermal energy that originated in the production fluid is transferred to the transfer fluid, thereby heating the transfer fluid. In a preferred embodiment, the fluid exiting the heat exchanger 122, indicated by flow arrow 126, is at a sufficient for converting the thermal energy captured from the production stream to electricity.

The overall temperature difference between production fluid entering heat exchanger 122 and production fluid exiting heat exchanger 122 will vary based on a number of factors. These include flow rate of transfer fluid, the flow rate of production fluid, the diameter of production tubing 112, the diameter of coiled portion 130, the length of tubing used for coiled portion 130, the depth at which coiled portion 130 is placed within wellbore 110, the temperature of production fluid flowing through production tubing 112. etc. The embodiment depicted in FIG. 1, is meant to be representative and not limiting. The design of such a heat exchanger may be modified to account for such factors to obtain an optimal temperature of the transfer fluid from heat exchanger 122.

In alternate embodiments, the heater exchanger 122 could be formed in other ways. For example, it could be incorporated into or permanently affixed to a wall of one or more joints of pipe from that make up the production tubing. In this embodiment, the heat exchanger could take a form other than a coil to increase the area of contact between the transfer or working fluid and the production tubing. For example, a pipe joint could be made of concentric walls, with the volume between them being used to create passageways through which fluid is circulated to be heated. The fluid could be, for example, delivered to a lower connection point and received to an upper connection point using tubing that returns the transfer or working fluid downhole and to carry it back to the surface, respectively.

Figure 2:
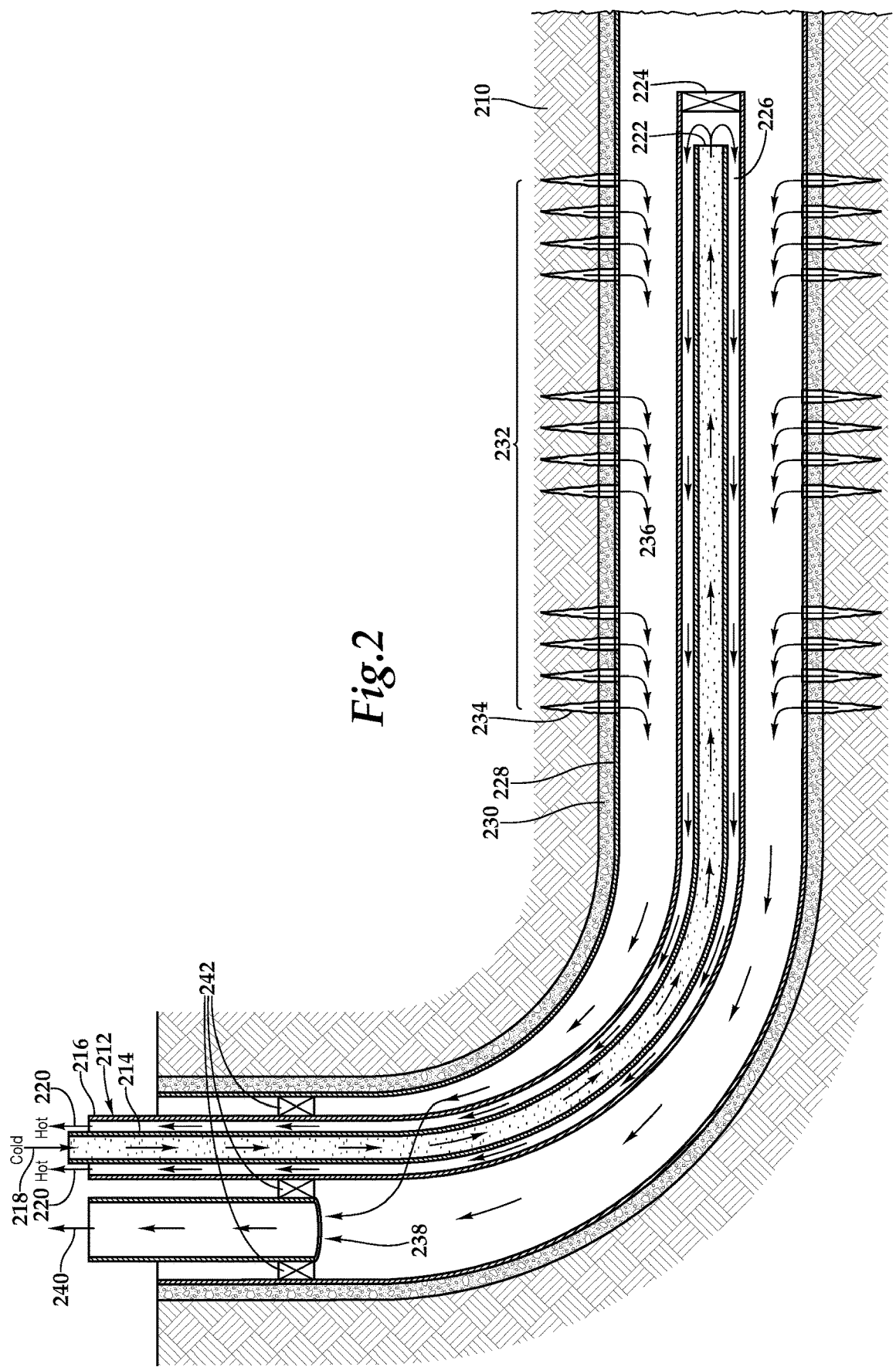
FIG. 2 depicts schematically another embodiment of a heat exchanger portion of a geothermal energy capture system for an oil and gas well.

Reference is now made to FIG. 2, which depicts another embodiment of a heat exchanger for transferring thermal energy from within a wellbore to an LTG unit or other geothermal capture system located at the surface. In this embodiment, a production flow is not used to carry heat from the formation. In the embodiment of FIG. 2, heat exchanger 212 is located within wellbore 210. In this example, wellbore 210 has a lateral segment. Heat exchanger 212 is comprised of an inner tubing 214 located inside an outer tubing 216. Transfer fluid enters heat exchanger 212 through the inside of inner tubing 214, as indicated by flow arrow 218, and continues to flow down hole through inner tubing 214 until the transfer fluid reaches opening 222 at the end of inner tubing 214. Because the end of the outer tubing 216 is closed by either a removable or permanent plug 224, fluid flowing out of opening 222 is forced into annulus 226, which is formed between the outer wall of inner tubing 214 and the inner wall of outer tubing 216. Continued fluid flow entering inner tubing 214, including by arrow 218 pushes transfer fluid exiting opening 222 into annulus 226. Heated transfer fluid flowing into annulus 226 is then returned to the surface, and exits outer tubing 216, as indicated by arrows 220, at which point it may flow to either LTE unit (not shown) to convert the thermal energy to electricity or other equipment for use of the thermal energy. indicated by flow arrow 220.

Wellbore 210 of FIG. 2 is a producing well that is lined with casing 228 and cemented annulus 230 between the outer wall of casing 228 and the wall of wellbore 210. Production fluid located in the formation surrounding wellbore 210 flows from production zone 232 through perforations 234, which allow for fluid communication between production zone 232 and the interior of casing 228. Pressure exerted by production fluids in production zone 232 results in flow of production fluids through perforations 234, as indicated by flow arrows 236. Continued flow of production fluid continues in the uphole direction, as indicated by flow arrows 238. Further flow of production fluid through casing 228 is prevented by plugs 242. Thus, production fluid flow is directed into production tubing 240.

As described in relation to FIG. 1, production fluids produced by wellbore 210 and production zone 232 are at an elevated temperature relative to surface temperatures. Heat exchanger 212 is used to transfer the excess thermal energy of the production fluid to a transfer fluid that is flowing through heat exchanger 212. The temperature of transfer fluid entering inner tubing 218 of heat exchanger 212 is relatively lower than the temperature of transfer fluid exiting the outer tubing 216 of heat exchanger 212. As transfer fluid flows through opening 222 and into annulus 226, the transfer fluid comes into contact with the inner surface of outer tubing 216. Because the outer surface of outer tubing 216 is in contact with downhole fluids within the wellbore, which are heated by the formation, the outer tubing 216 is heated. This increased thermal energy is then transferred to transfer fluid flowing through annulus 226. Continued flow of transfer fluid through annulus 226 results in heated transfer fluid exiting annulus 226 as indicated by flow arrow 220.

Optionally (not shown), inner tubing 214 may be thermally insulated relative to annulus 226 to prevent transfer of thermal energy from higher temperature transfer fluid flowing through annulus 226 to cooler transfer fluid flowing through inner tubing 214, which may result in lowering the temperature of transfer fluid exiting heat exchanger 212. Any known thermal insulation barrier may be used to accomplish thermal isolation between transfer fluid flowing through annulus 226 transfer fluid flowing through inner tubing 214.

As in described in relation to FIG. 1, the difference in temperature between production fluid entering heat exchanger 212 and production fluid exiting heat exchanger 212 will vary upon a number of factors. These include flow rate of transfer fluid, the flow rate of production fluid, the diameter of casing 228, the diameter of inner tubing 214, the diameter of outer tubing 216, the length of inner tubing 214 and outer tubing 216, the depth to which heat exchanger 212 extends into wellbore 210, the temperature of production fluid. etc. The embodiment depicted in FIG. 2 is meant to be representative and not limiting. The design of such heat exchanger 212 may be modified to account for such factors to obtain an optimal temperature of the transfer fluid from heat exchanger 212.

Figure 3:
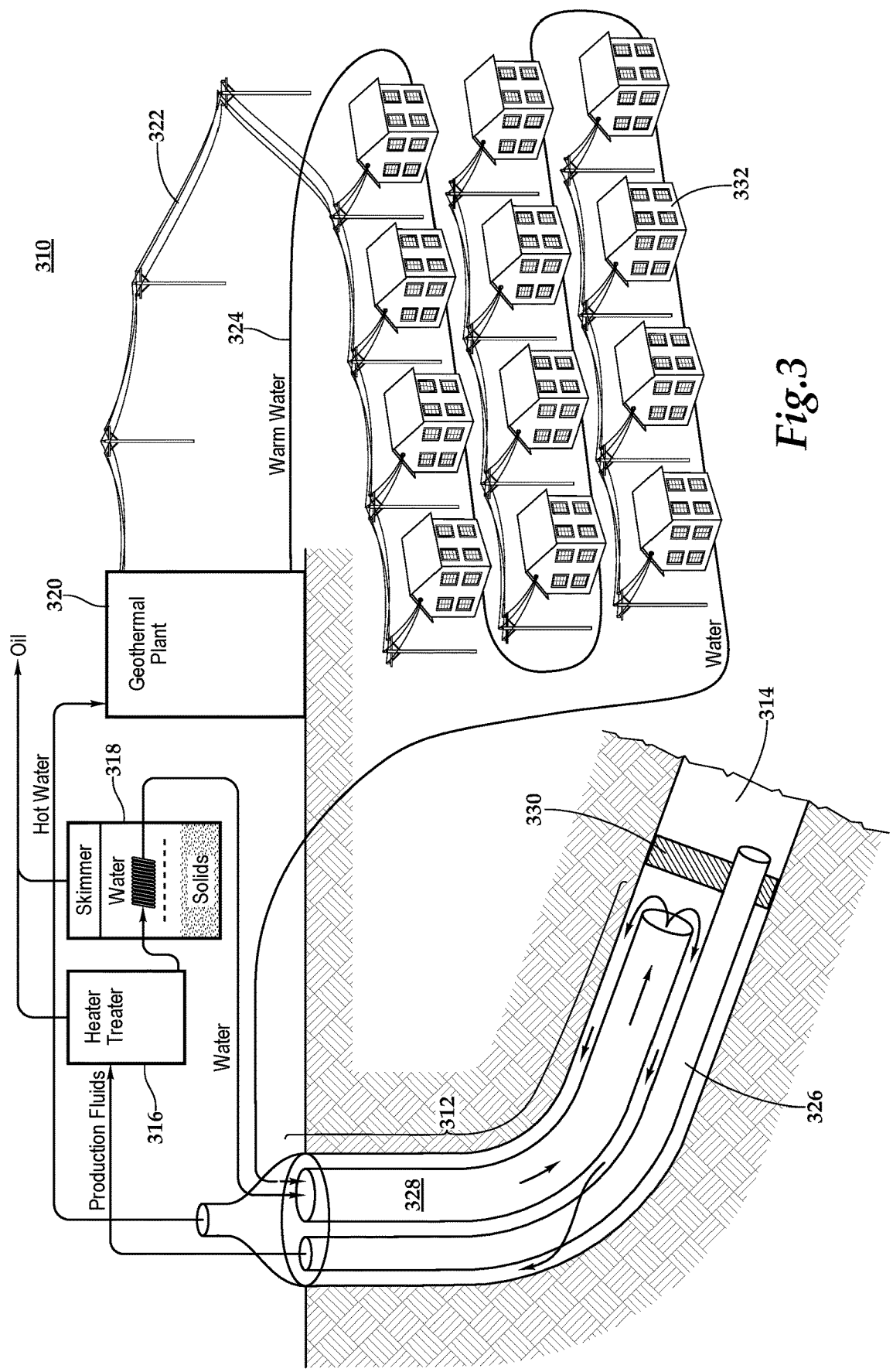
FIG. 3 is a schematic representation of a geothermal energy capture system for an oil and gas well.

Reference is now made to FIG. 3, which is a schematic depiction of one embodiment of geothermal energy capture system including geothermal and electrical distribution. Geothermal energy capture system 310, in the depicted exemplary embodiment, comprises heat exchanger 312 located in well 314; heater treater 316; skimmer 318; geothermal plant 320; electrical distribution 322; and heat distribution 324. The exemplary embodiment of geothermal energy capture system 310 takes advantage of natural water production, which occurs from well 314.

Production fluids flow from within well 314 into production tubing 326. While production of hydrocarbons, such as oil, is the primary purpose of well 314, typically production fluids include, not only oil, but also natural ground water. Thus, the effluent of production tubing 326 comprises a mixture of oil and water. Furthermore, having been heated by the formation from which it flows, the production fluid is hot. Production fluid, once reaching the surface, flows into heater treater 316, where the water and oil of the production fluid are separated. Oil is output from heater treater 316 for collection, processing, and sale. While, heater treater 316 separates the bulk of hydrocarbons in the production fluid from the water portion of the production fluid, the effluent water stream of heater treater 316 contains residual hydrocarbons. In addition, the water output of heater treater 316 may contain solids.

The water stream output of heater treater 316 is transferred to skimmer 318 for further processing to remove additional hydrocarbons and solids from the water stream. Skimmer 318 separates hydrocarbons, which are added to the output oil stream of heater treater 316; solids, which are settled to a collection tank of skimmer 318; and water, which is output from skimmer 318.

Output water from skimmer 318 is directed into inlet pipe 328 of heat exchanger 312. Inlet pipe 328 is located in well 314 above plug 330. Plug 330 isolates production fluids, located downhole from plug 330, from the portion of well 314 above plug 330. A downhole end of inlet pipe 328 is open and located near plug 330, which allows water to flow from inlet pipe 328 into the portion of well 314 above plug 330. In this manner, the portion of well 314 above plug 330 is filled with water. Since production tubing 326 is also located in the portion of well 314 above plug 330 and hot production fluid is flowing through production tubing 326, thermal energy of the production fluid is transferred to water flowing through the portion of well 314 above plug 330. Thus, this water is heated to a temperature sufficient for use in geothermal plant 320.

Hot water flowing from the portion of well 314 above plug 330 flows into geothermal plant 320. Geothermal plant 320 is any geothermal facility capable of converting thermal energy into electrical energy, such as is described herein in relation to other embodiments. Thus, geothermal plant 320 produces electricity, which, in this exemplary embodiment, is distributed to houses 332 for use. In addition, cooler water is also output from geothermal plant 320. While, the temperature of output water from geothermal plant 320 is relatively cooler than the input temperature of water into geothermal plant 320, the temperature of output water is sufficiently warm to be used as a heat source for houses 332. Thus, water output from geothermal plant 320 flows into heat distribution system 324. The output water of geothermal plant 320 flows through heat distribution system 324 and to houses 332 and therefore provides a heat source and hot water source to houses 332. Water used in heat distribution system 324 is then returned to input pipe 328 of heat exchanger 312.

Reference is now made to FIG. 4, which depicts one embodiment of a heat exchanger portion of a geothermal capture system located in a wellbore. In the embodiment depicted in FIG. 4, heat exchanger 410 is disposed inside wellbore 414. Heat exchanger 410 comprises a length of tubing 412 used to recirculate and heat transfer fluid used in a geothermal energy capture system. Transfer fluid is pumped into one end of tubing 412 of heat exchanger 410 extending at the surface from wellbore 414. Transfer fluid then flows in the downhole direction through the tubing 412 of heat exchanger 410, to a depth at which downhole temperatures are high enough to heat the transfer fluid to a temperature appropriate for use in a geothermal energy capture system. By allowing the transfer fluid to dwell downhole for longer, the transfer fluid is heated to a higher temperature. The tubing 412 of heat exchanger 410 has, at its furthest downhole end, bend 418. Bend 418 redirects the tubing 412 of heat exchanger 410 back toward the uphole direction, so that, once heated to the desired temperature, the transfer fluid is returned to the surface for use in a geothermal energy capture system. Wellbore 414, in this embodiment is a producing well in which production fluids flow from the wellbore in the uphole direction and through production tubing 416. Downhole production fluids initially flow through well 414 but are prevented from further uphole flow through well 414 by plugs 420. This directs flow of production fluids into production tubing 416. The thermal energy of production fluids travelling over and around the downhole tubing 412 of heat exchanger 410 is transferred to the transfer fluid flowing through heat exchanger 410.

Reference is now made to FIG. 5, which depicts one embodiment of a heat exchanger portion of a geothermal capture system located in a wellbore. The embodiment of heat exchanger 510 depicted in FIG. 5 is similar to that of heat exchanger 410 of FIG. 4. Heat exchanger 510, like heat exchanger 410, comprises a tubing 512 that extends into wellbore 510 and which at its most downhole end has bend 518. Like in the embodiment of FIG. 4, transfer fluid flows into tubing 512 at a relatively cooler temperature, is heated while down hole, and is returned to the surface for use in a geothermal energy capture system. The difference between the embodiment of FIG. 4 and the embodiment of FIG. 5 being that tubing 512 is located inside outer tubing 520, which protects tubing 512 from a corrosive downhole environment. Outer tubing 520 may be filled with a thermal transfer medium to facilitate transfer of thermal energy from production fluid to transfer fluid. The embodiment of FIG. 5 is also a producing well, where production fluids flow from wellbore 510 to the surface through production tubing 516. Downhole production fluids initially flow through well 514 but are prevented from further uphole flow through well 514 by plugs 522. This directs flow of production fluids into production tubing 516.

Reference is now made to FIG. 6, which depicts one embodiment of a heat exchanger portion of geothermal energy capture system located in a wellbore. Heat exchanger 610 is similar to the heat exchanger 122 in that it comprises coiled portion 612, which is coiled around production tubing 618. Relatively cooler transfer fluid enters the heat exchanger 610 through one end of tubing 612 at the surface. This transfer fluid then flows downhole through the coiled section of tubing 612. The downhole end of tubing 612 comprises bend 620, which redirects the coiled portion of tubing 612 back in the uphole direction. Tubing 612 continues in a coiled manner around production tubing 618 to provide further contact between tubing 612 and production tubing 618. Transfer fluid ultimately exits heat exchanger 610 upon where tubing 612 returns to the surface. Like in the previously described embodiments of heat exchangers, relatively hot production fluid flows from wellbore 614 into production tubing 618. Downhole production fluids initially flow through wellbore 614 but are prevented from further uphole flow through wellbore 614 by plugs 622. This directs flow of production fluids into production tubing 618. Since tubing 612 of heat exchanger 610 is in contact or close to production tubing 618, thermal energy transfer occurs from the production fluid in production tubing 618 to transfer fluid flowing through tubing 612. Therefore, the temperature of the transfer fluid is increased as it flows through tubing 612.

Reference is now made to FIG. 7, which depicts one embodiment of a heat exchanger portion of a geothermal capture system located in a wellbore. Heat exchanger 710 is comprised of tubing 712 inserted into annulus 716 of wellbore 714. Wellbore 714 is a producing well in which production fluid flows from within wellbore 714 into production tubing 720. Annulus 714 is the space between the exterior of production tubing 720 and the wall of wellbore 714. Annulus 716 is separated from fluid communication to the downhole portion of wellbore 714 through which production fluid is flowing by plug 718. Transfer fluid enters heat exchanger 710 through tubing 712. The downhole end of tubing 712 is open and allows flow of transfer fluid into annulus 716. Transfer fluid then continues to flow upward through annulus 716 at which point it is redirected to flow into the remaining portion of a geothermal energy capture system (not shown). As hot production fluid flows through production tubing 720, the thermal energy of the production fluid is transferred through production tubing 720 and into transfer fluid flowing through annulus 716. Thereby heating transfer fluid as it flows through heat exchanger 710.

Figure 8:
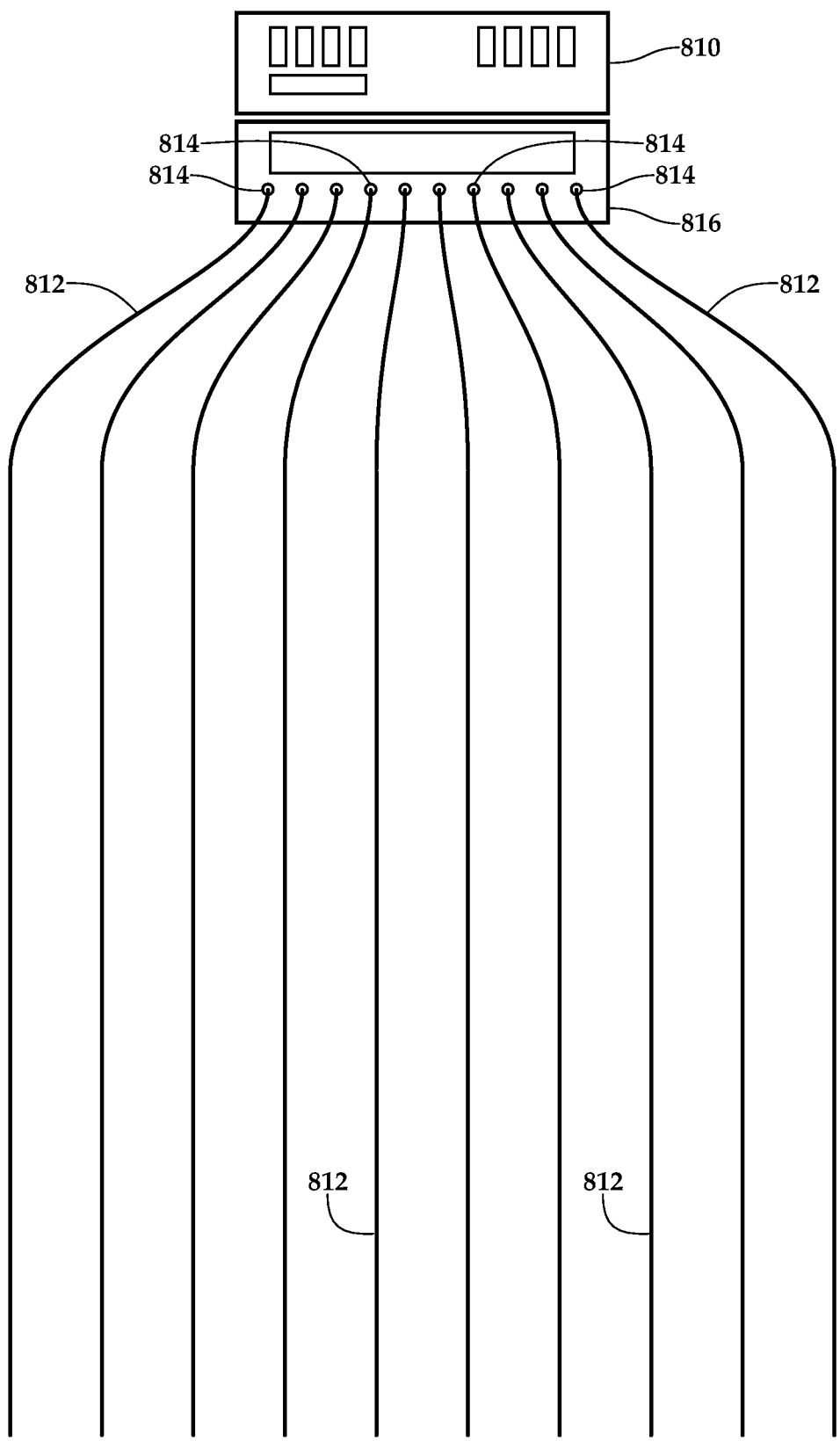
FIG. 8 is a schematic depiction of multiple wells associated with a drilling pad with a central geothermal energy capture station or unit.

Referring now to FIG. 8, while a single LTG unit could be placed at each wellbore, geothermal energy obtained from multiple wellbores could be converted by a single system. In the schematically illustrated example of FIG. 8, multiple wellbores 812 extend from wellheads 814 at a drilling pad 816. What will be referred to herein a geothermal station 810 is located at the drilling pad. It may include one or more LTG units for converting to electricity geothermal energy that is obtained from each of the wellbores 812 at the pad using one or more of the heat transfer methods described above. The geothermal station may optionally include additional equipment for processing production streams, transfer fluids, or other well-site operations. This arrangement offers several possible benefits. It lowers infrastructure costs to build and operate a system for capturing and converting geothermal energy from existing oil and gas wellbores. Having a single geothermal station servicing a plurality of wellbores is that the loss of use of equipment dedicated to a single wellbore can be avoided should the wellbore become too cool or require servicing. Furthermore, additional wells are added at the pad, less infrastructure will need to be added to begin to capture geothermal energy from that well and convert it to electrical power.

Having a single geothermal station 810 service a plurality of wells also takes advantage of a typical well arrangement found in shale production fields, where it is often necessary to drill multiple wells in relatively close proximity to each other in order to gain access to the shale reservoir.

In following description FIGS. 9, 10, and 11A-11E, carbon dioxide is the preferred gas and thus it will refer to carbon dioxide. However, other gases could be substituted in parts of the processes described below. Examples of such gases include nitrogen, well gas (mostly methane), and combinations of these or other gases. References to carbon dioxide should therefore be considered also as references to these substitute gases except where it is not possible to substitute the gas, particularly in connection with parts of the processes described in connection with FIG. 9 and in FIG. 10.

Figure 9:
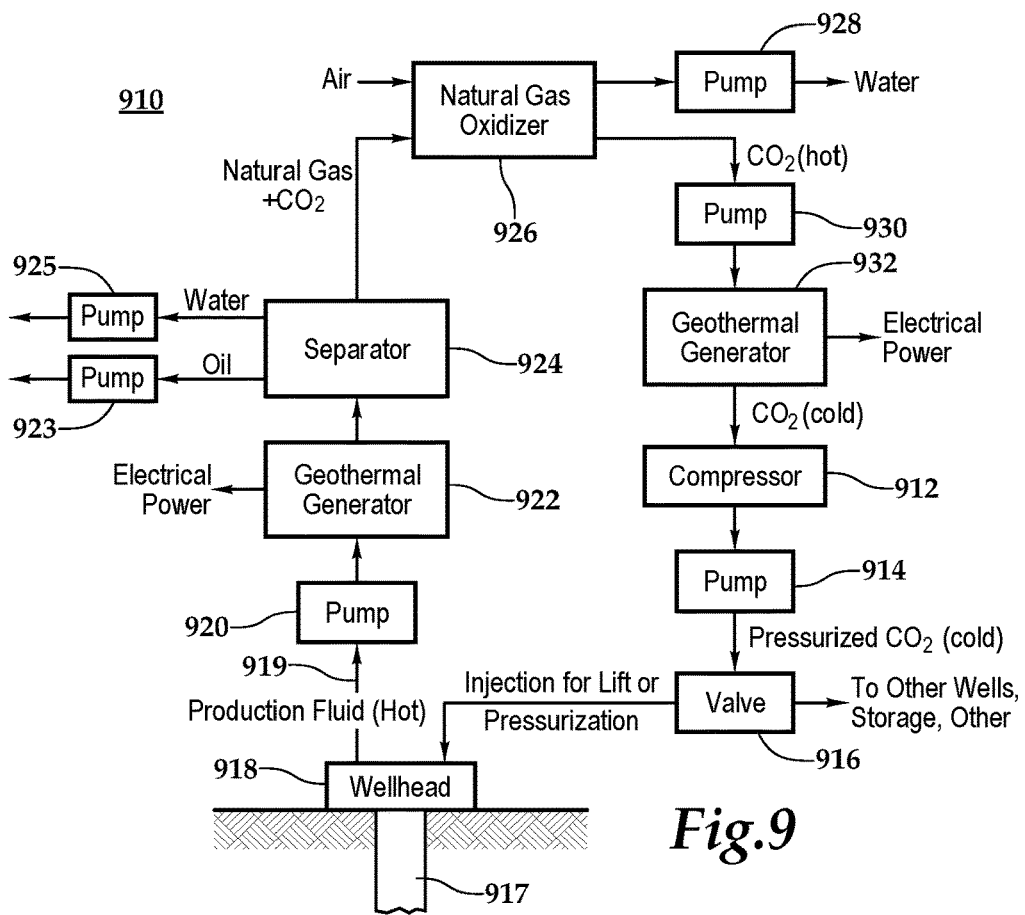
FIG. 9 is a schematic illustration of a method and apparatus for recapturing carbon dioxide used by an enhanced oil recovery (EOR) method.
Figure 10:
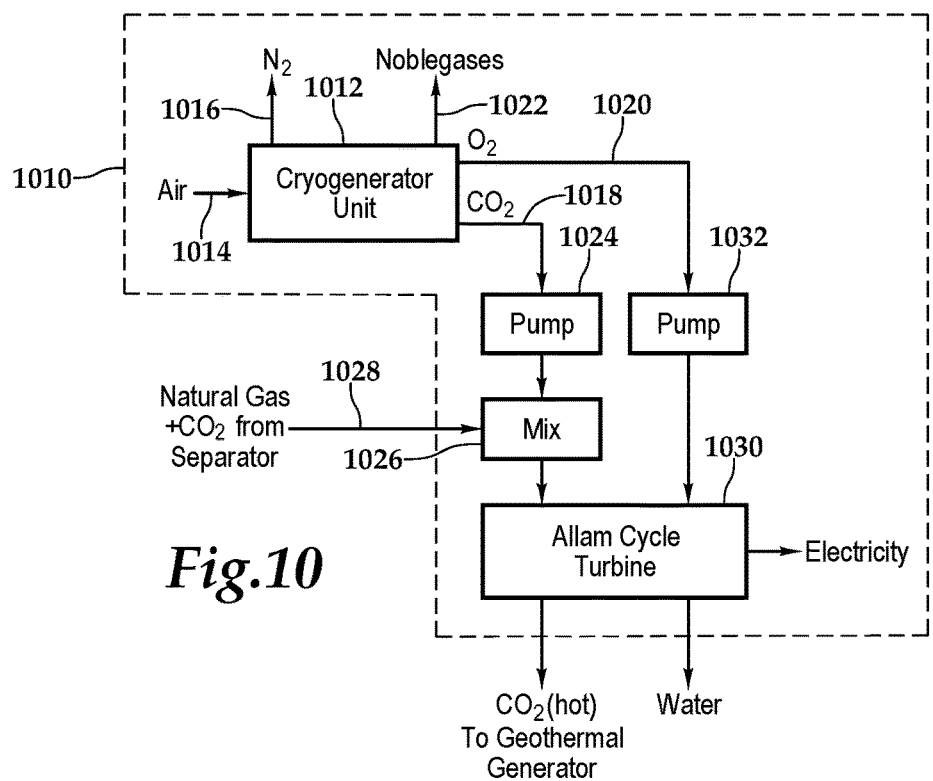
FIG. 10 schematically illustrates a method and apparatus for oxidizing natural gas as part of carbon dioxide recapture process.

FIGS. 9 and 10 are schematic depictions of a representative, non-limiting embodiment of a example of enhanced oil recovery (EOR) method and system 910 that recovers carbon dioxide (or other gas that might be substituted) for re-injection into the same or different well, which is capable of being powered at least in part by geothermal energy stored in a production stream. The method contemplates generation of electricity using one or more geothermal power generators, 4 in such as LTG units, that will be used to provide at least some, if not all, of the electrical power or other energy power needed to operate the equipment and processes used to recover, compress, pump, and/or inject the carbon dioxide, or possibly using it instead, or in addition, to operate other equipment at the site or to sell it back to the power grid.

In this embodiment, the method relies on a modification of a known EOR method called "huff and puff" to stimulate production. This method is describe above, but briefly it involves injecting a gas, such as carbon dioxide, nitrogen, methane, or well gas into the well under pressure to increases the pressure in the production zone and, with sufficient pressure and time, force the gas into the oil trapped within the rock around the wellbore. This will allow oil still trapped within the rock to flow more easily out of the rock. Although certain advantages and benefits can be achieved when using the described method with the system 910, it is possible adapt the methods and the equipment to use other variations of the huff and puff EOR method, as well as other EOR methods.

Prior to being injected by a pump, the carbon dioxide is compressed by one or more compressors such as compressor 912 to create high pressure carbon dioxide gas or liquified carbon dioxide in an output line. The compressed carbon dioxide can be injected into a well to pressurize the well in a huff and puff process or to create lift for production flow. It could also be pumped to other wells for this purpose or for storage. This is represented by optional valve 916. The valve 916 is be representative of any combination or assembly of one or more valves and related equipment, or any other means, for controlling the delivery of or distribution of compressed carbon dioxide to a single well or to one or more wells, for example multiple wells at a single drilling pad or a one or more wells at each of several drilling pads, for use as described below. The well 917 is intended to represent any of the one or more wells. The carbon dioxide could also be directed to a carbon dioxide storage equipment (not shown) that is centrally located or located at each well head so that the carbon dioxide can be stored for injection into wells. Furthermore, the compressor is intended to be representative of systems comprising one or more compressors and associated equipment for compressing the carbon dioxide.

In this example, the compressed carbon dioxide that is compressed by compressor 912 can be optionally reinjected into well 918 to create "lift" to help carry the oil produced from the rock to the surface. The carbon dioxide being compressed by compressor 912 is being recovered from the production flow using methods described below. However, although this is not shown, compressed carbon dioxide (uncompressed carbon dioxide which is then compressed) from other sources could be injected into well 917 for lift or soaking if the production flow from well is stopped to allow the well to be pressurized and for the carbon dioxide to be absorbed by the oil in the formation. This later use is the "huff" step in the huff and puff methods disclosed above and below. After the soaking period is over, and the well is ready for production flow to start or resume, production tubing at the wellhead 918 is opened to allow production fluids to flow.

Production fluids 919, which are represented by a line extending between wellbore 918 and pump 920, will begin to flow. Production fluids will be a mixture of oil, well gases, such as methane, water, and the carbon dioxide injected into the well. The production fluid will be relatively hot due the heat of the formation. The production fluid is, in a preferred embodiment, hot enough to power a low temperature geothermal unit (LTG).

The production fluid is pumped by the pump 920 to a geothermal generator 922. The pump is intended to be representative of one or pumps or a system or means for moving the production stream. It is not required.

In a preferred embodiment, the geothermal unit is comprised one or more LTG units or components of such units. The geothermal generator 922 can be at or near the well site, on a drilling pad for the will site, or at a remote location, or components of it may be distributed between the site of the well and other locations. In alternate embodiments, other types of generators or other systems for harvesting the thermal energy stored in the production stream for conversion to other forms of energy or as heat for use in other processes may be substituted for the geothermal generator 922.

The transfer of the heat or thermal energy from the production stream to the geothermal generator may be accomplished by any one of several methods, including those described above. For example, the production flow may pass through one or more heat exchangers that function to transfer thermal energy to—to heat, in other words—a transfer fluid, which in turn is circulated to a boiler or component of the LTG unit for purposes of transferring thermal energy to the LTG unit's working fluid. Furthermore, although not illustrated, the heat exchanger for capturing thermal energy from the production stream can, optionally, be located within the wellbore rather than at the surface.

Transferring thermal energy stored in the production stream to the geothermal generator 922 will lower the temperature of the production stream. This cooler stream of fluids is passed through a separator 924. Separator 924 is representative of any process or combination of processes that separates the oil, water and gas components of the production stream and the systems that function to separate the production stream into two or more of these components. It may comprise multiple separation units. The oil components separated from the production stream are directed for collection and further processing. The water is collected for additional processing and handling (including disposal.)

The gas components will include carbon dioxide that was injected into the well and well gas or natural gas, which is usually mostly methane. To separate the carbon dioxide and natural gas, the natural gas is oxidized with an oxidizer 926. The oxidizer 926 is representative of a process that oxidizes or burns the natural gas, resulting in additional carbon dioxide that is mixed with the recovered carbon dioxide from the production stream and water. Different methods of oxidizing the natural gas to remove it from the gas stream are possible. For example, it can be burned or "flared" off. A thermal oxidizer could also be used. Another type of oxidizer is shown in FIG. 10.

The water produced is redirected by pump 928 and collected for later use or disposal. The carbon dioxide exiting natural gas oxidizer 926 will be hotter than the relatively cold or cooler gas stream from the separator 924.

If the increase in temperature results in the carbon dioxide is sufficient for transferring the thermal energy for generating electrical power, the thermal energy from the oxidation process may, optionally, be used to produce electricity for other purposes. In this representative example, the thermal energy is transferred to a power generation process, represented by geothermal generator 932, by pumping it through the geothermal generator using pump 930. Pump 930 is representative of an assembly of one or more pumps for purposes of increasing the pressure of the carbon dioxide. It should be noted, that in the representative embodiment of FIG. 9, geothermal generator 922 and geothermal generator 932 are presented as distinct and different components. Geothermal generator 922 and geothermal generator 932 may, alternatively, be the same geothermal generator or share part of it. The single LTG unit, for example, could be modified to receive heat from both flows.

Upon exiting geothermal generator 932, the carbon dioxide will be relatively cool. The cool carbon dioxide is then compressed by compressor 912 for reinjection into the same well (for lift), injection into a different well for lift or for pressurizing the well for the huff and puff soaking cycle, or to storage. In this example, the carbon dioxide is shown being compressed by compressor 912 for possible reinjection into the same wellbore 917 for lift.

The carbon dioxide recovery and geothermal power generation system 910 shown in FIG. 9 (excluding well head 918 and pump 920) can be used to service multiple wells.

The process of FIG. 9 is meant to be representative of a process by which carbon dioxide used for will stimulation can be recovered while generating geothermal power for at least partially powering the equipment used to recover the carbon dioxide. It could be modified according to implement a different EOR process while capturing capture thermal energy from production flow to power the EOR. Conversely, the carbon dioxide recovery and reuse processes could be practiced without capturing and converting to electrical power the thermal in the production flow and/or the thermal energy introduced into the recaptured carbon dioxide stream by the processes separating the recapture of the carbon dioxide.

Referring now to FIG. 10, illustrated is an alternate example of an oxidizer and method for oxidizing the natural gas in gas stream separated from a production flow, using an Allam Cycle. An Allam cycle oxidzer 1010 is non-limiting example of one type oxidizer and oxidation process that may be used as the oxidizer 926 in FIG. 9. A cryogenerator unit 1012 takes ambient air 1014, separates the its components into a nitrogen stream 1016, a nitrogen stream 1016, carbon dioxide stream 1018, an oxygen stream 1020, and stream containing noble gases and other minor components 1022. The nitrogen and noble gas streams may be collected and stored for transport or sale or may be released back into the atmosphere. The carbon dioxide stream is transferred by pump 1024 into mixer 1026, which mixes or merges the carbon dioxide stream 1018 from cryogenerator unit 1012 with a natural gas and carbon dioxide stream 1028 produced by separator 924 of FIG. 9. The resulting, pressurized mixture is then used as an input stream into Allam cycle turbine 1030. In addition, the oxygen output stream from cryogenerator unit 1012 is also pressurized by pump 1032 for feeding into Allam cycle turbine 1030 for use as a fuel.

Allam cycle turbine 1030 utilizes the carbon dioxide, natural gas, and oxygen stream to generate electricity. The outputs of Allam cycle turbine 1030 are hot carbon dioxide, water and electricity. The water may be collected for disposal or other uses. The hot carbon dioxide is fed into a geothermal generator (not shown) and used to generate additional electricity. In the example described in connection with FIG. 9, the geothermal generator is geothermal generator 932.

FIGS. 11A-11E represent methods of enhancing recovery of oil from a group of wells and, optional, multiple groups of wells, using carbon dioxide (or other gas mentioned above as being substitutable). A group of wells may, for example, includes those at a drilling pad or wells that otherwise have a relatively close geographical proximity. The groups of wells may also have geographical proximity.

In one embodiment, the method further includes the optional step of recovering carbon dioxide (some, most, or all) that has been injected into at least one of the wells and, in one example, all of the wells forming a group, and in another example, from all of the wells in multiple groups of wells. The recovered carbon dioxide is injected into the same well (from which it is recovered) and, optionally, the other wells in the same group other groups.

In each of these embodiments, the carbon dioxide recovery process may, optionally, convert thermal energy stored in the production flows from one or more of the wells to electrical power using geothermal power generators or units. This electrical power may, optionally, be used to power some or all of the recovery process. This electrical power may, optionally, be used to power some or all of the recovery process. It may also be used to power other operations associated with the wells or stored. Alternatively, the thermal energy in the production flow may be captured without conversion to electrical power and stored and/or used as such in operations associated with the wells (including carbon dioxide recapture) or other uses requiring heat.

What is illustrated by FIGS. 11A-E is schematic and intended to be representative of several processes that can be used to coordinate stimulation of multiple wells in a group of wells, or wells that are a part of multiple groups of wells, in a manner that allows for capture and reuse of the carbon dioxide. The type stimulation contemplated includes a "huff and puff" type of method that enhances release of oil from the formation, a gas lift to increase production flow rates, or a combination of the two. The following description is not intended to imply that other stimulation methods using carbon dioxide or other gases cannot be used in place of or in addition to carbon dioxide or that other methods of stimulation cannot be used concurrently.

FIGS. 11A-11E depict a series of stages in the operation of cycle of a coordinated effort to stimulate with carbon dioxide (or other gas) a group of wells and multiple groups of wells. The figures depict schematically multiple groups A through N, with Groups A, B, and N explicitly shown and referenced by numbers 1112a, 1112b, and 1112n, respectively. Each group has two or more wells, numbered 1 to n, with the wells referenced by numbers 1114(1), 1114(2), 1114(3) to 1114(n). The figures imply that there are 4 wells in each group, but there could be fewer than 4. The method below would also apply to a single group with multiple wells.

The wells in each group is, in this example, serviced by or share a system for recovery of the gas used in the stimulation (e.g. carbon dioxide) from the production stream, such as system 910 of FIG. 9. Such system may also generate power from geothermal energy stored in production flows and/or the heat generated in the process of separating the gas from the production flow. However, alternatively, each well could have its own system, or a single, central system could service more than one group or all the groups.

The wells in a group may be at the same drilling pad or otherwise in close, geographical proximity. The wells can be groups instead by other considerations or additional considerations involving, for example, how easy it is to share the equipment or infrastructure, the formation in which the well is located, the stage in the life of the well, and the type or particular requirements of the EOR method to be used.

FIGS. 11A-11E together depicts a representative embodiment of the steps comprising a representative example of the methods. Beginning at FIG. 11A, a first well 1114(1)(1) in each group injected with a carbon dioxide, which will be referred to as "Phase 1" of the process. This is the "huff" phase in a huff and puff EOR method. Injection of carbon dioxide for the "huff" phase of the EOR process is indicated by solid down arrows 1116 in all each of the FIGS. 11A-11E. Injection of a carbon dioxide into the first wellbore 1114 pressurizes the well bore. Injection continues at least until a minimum miscible pressure is reached.

Figure 11A:
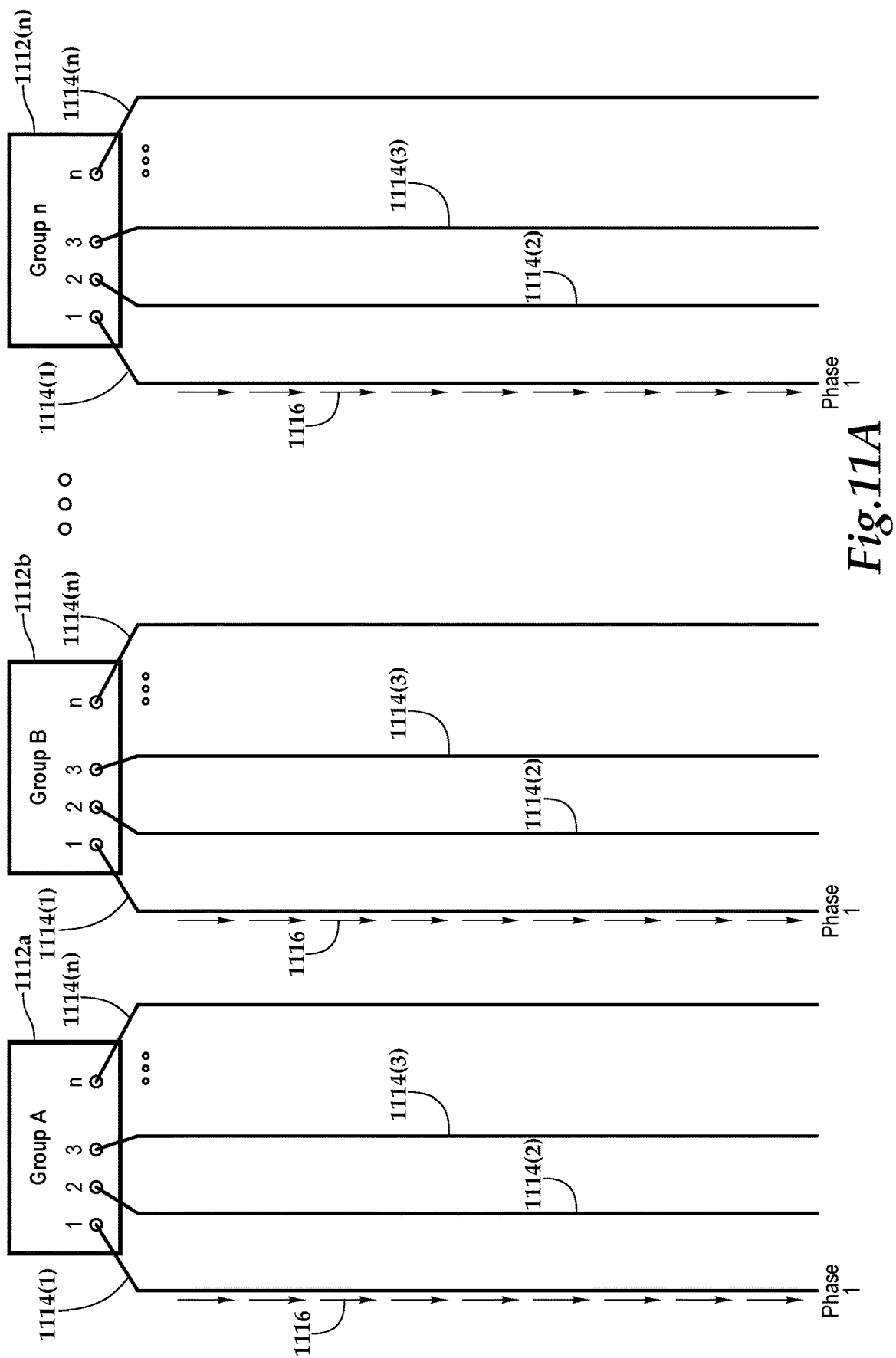
FIGS. 11A-11E is each a schematic representation of groups of wells in various stages of a coordinated enhanced oil recovery method.
Figure 11B:
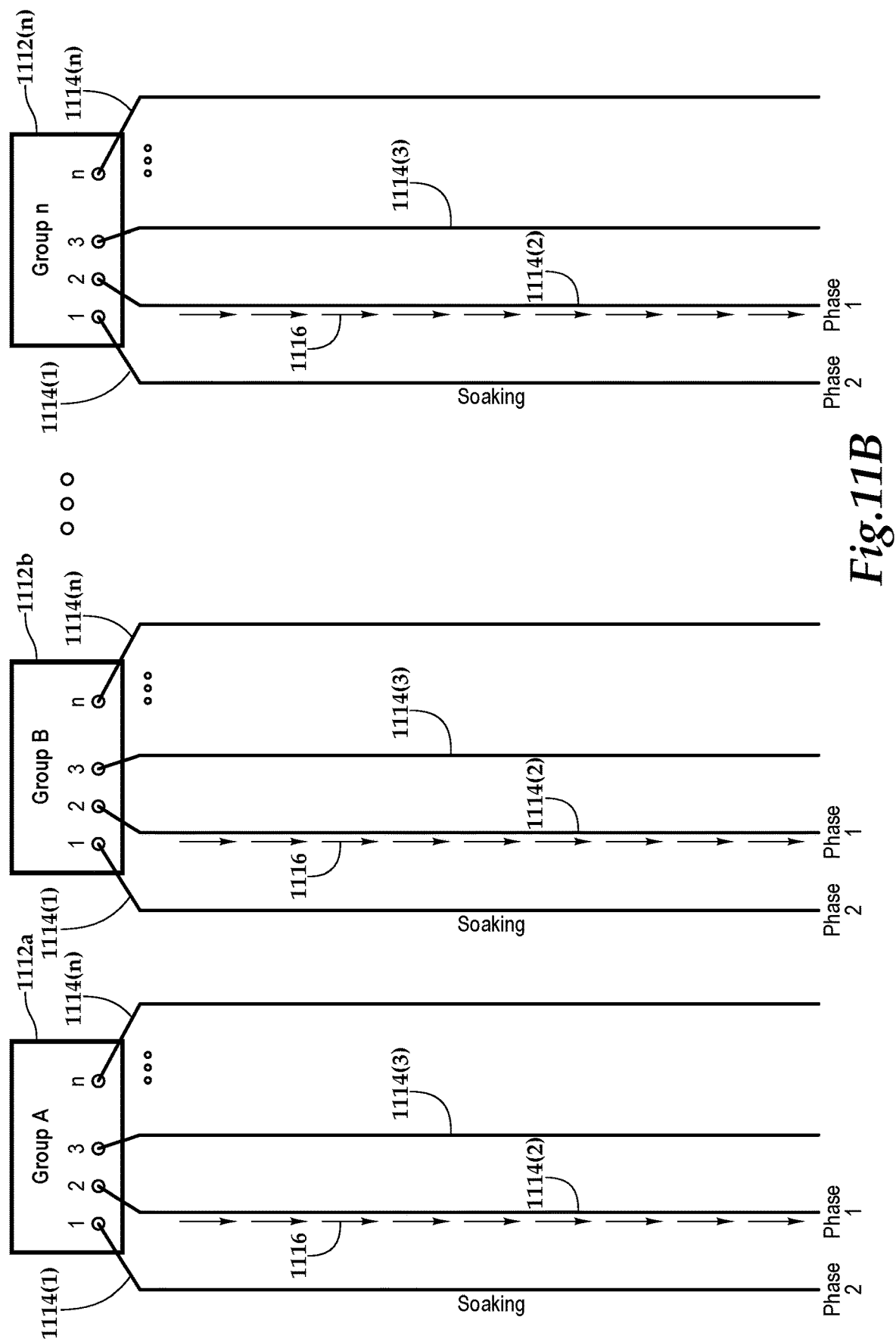

Referring now to FIG. 11B, once the first well 1114(1) associated with each group 1112a to 1112n has been injected with carbon dioxide and Phase 1 has been completed. Those wells then enter Phase 2, during which carbon dioxide is allowed to "soak" into the oil in the formation around the well bore to form a miscible mixture. This will lower the viscosity of oil, helping to free trapped oil deposits within the formation, thus enhancing oil recovery. The soaking time will vary by well.

The carbon dioxide injected into well is at a relatively lower temperature than that of the formation surrounding the well. Injection of carbon dioxide into a well will tend to lower the temperature within the well. It is preferred, though not required, to allow the temperature of the well to recover and return to a thermal equilibrium. The soaking time also allows the time for thermal equilibrium to be reached.

While the first well 1114(1) in each of the one or more groups is soaking, Phase 1 for a second well 1114(2) associated with each group can be started by injecting it with carbon dioxide.

Figure 11C:
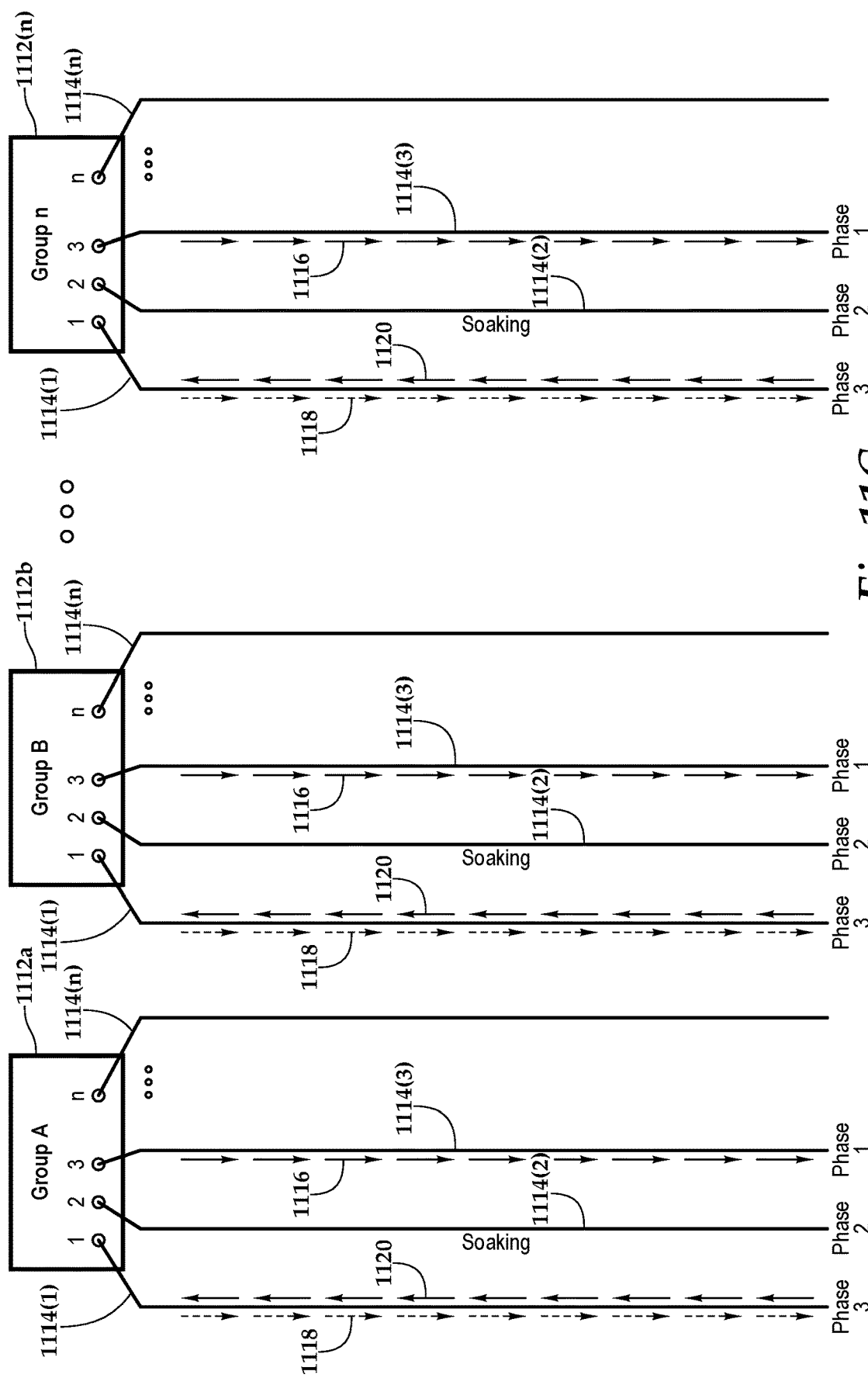

FIG. 11C depicts a state in which the first well 1114(1) in each group is now in Phase 3 and the second well 1114(2) in each group is soaking in Phase 2. Phase 3 is a production phase. The well has finished soaking and is opened to allow well fluids to be produced at the surface. The production flow, indicated by solid upward arrows 1120, contains natural gas, the carbon dioxide that was injected, water, and possibly other substances. During Phase 3, carbon dioxide is being injected into the well, as indicated by downward dashed arrows 1118, to provide additional "lift" to improve the flow rate. At the surface the production flow is handled, in one embodiment, as described in relation to FIGS. 9 and 10.

Phase 3 of well 1114 continues as long as production fluid remains at or above an optimal temperature for continued operation of group 1112. The flow rate of carbon dioxide being injected during Phase 3 may be adjusted to provide optimal flows rate of production fluid at optimal surface temperatures for operation of group 1112. For example, as carbon dioxide is injected into well 1114 and production flow occurs at the surface, the temperature of production fluids reaching the surface will be expected to decline due in part to the injection of relatively "cold" carbon dioxide. To mitigate against temperature drop, the flow rate of carbon dioxide can be decreased.

At the same time, Phase 1 injection of carbon dioxide be started with the third well 1114(3) in each group 1112a to 1112n.

Figure 11D:
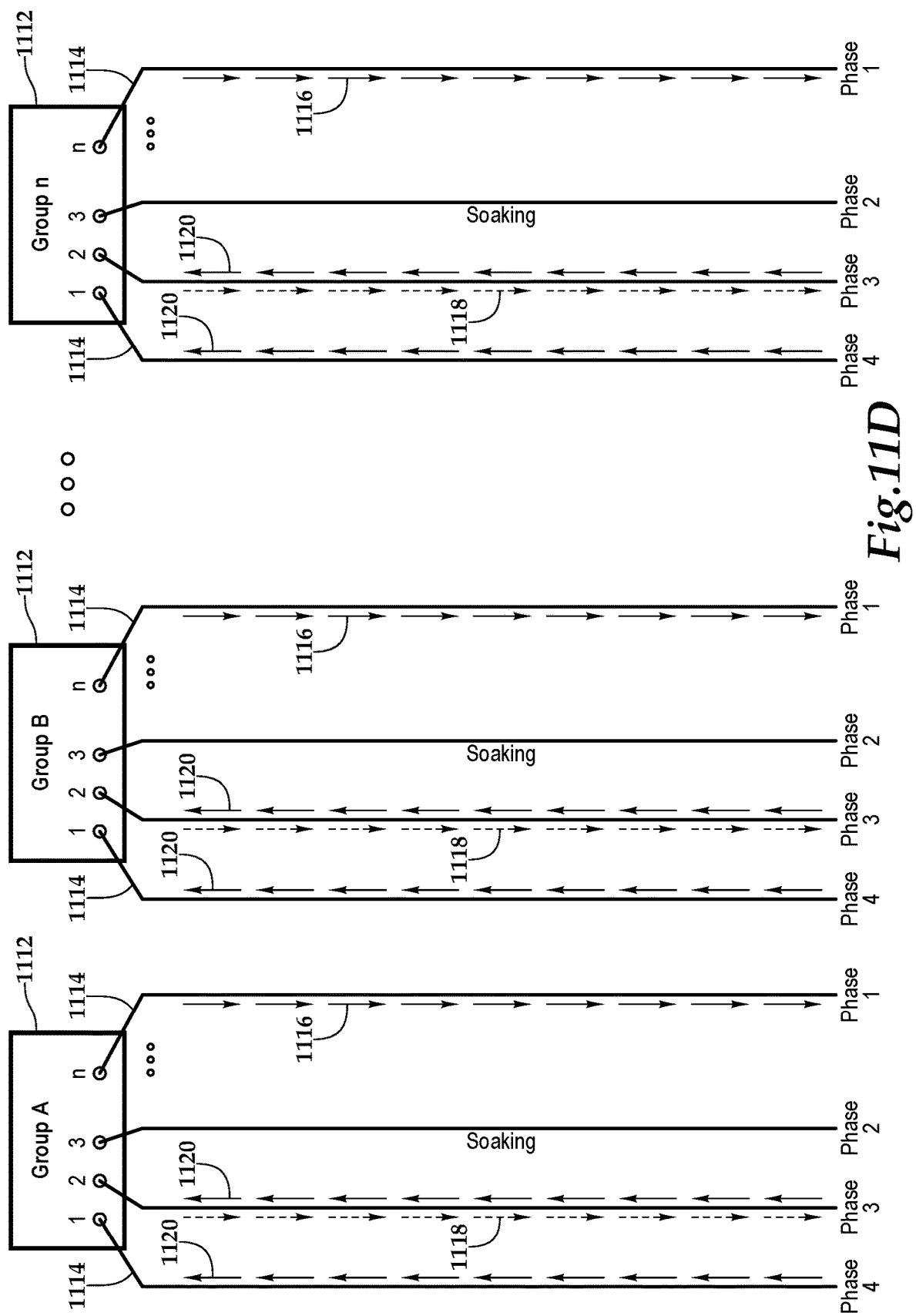

FIG. 11D a state in which each of the first wells 1114(1) enters a Phase 4, each of the second wells 1114(2) are in Phase 3, each of the third wells is in Phase 2, and another well, 1114(n), is in Phase 1. In phase 4, the injection of carbon dioxide to provide lift is stopped to preserve the temperature and prevent from dropping too low while continuing to produce. Lift may also not be needed. A well might skip Phase 3 and go directly to Phase 4.

Figure 11E:
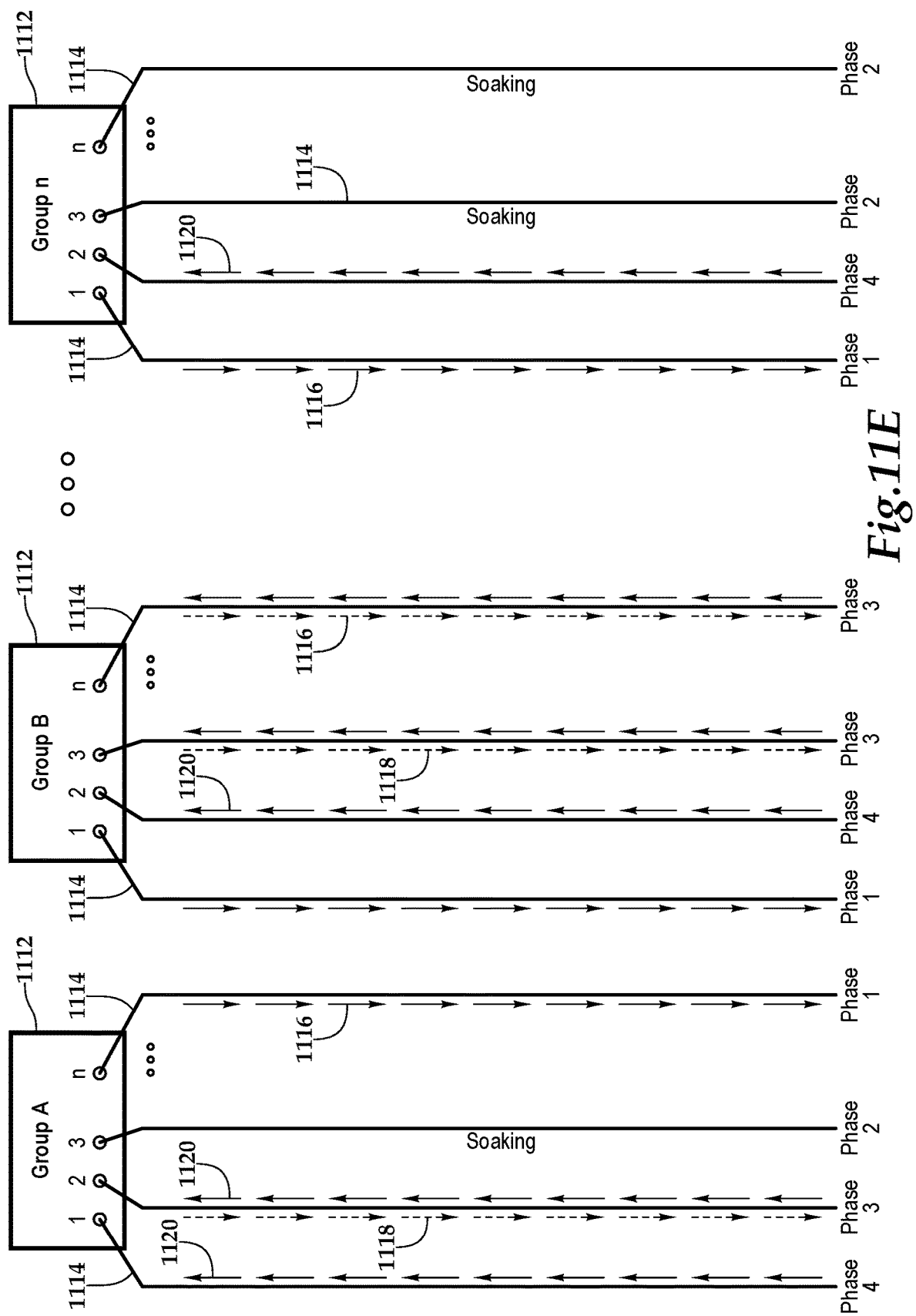

If the temperature of a well drops below a desired temperature, the cycle can, if desired, begin by putting the well into Phase 1. This cycle of phases can be repeated indefinitely to continue to capture oil and geothermal energy from well. FIG. 11E is intended to represent the possibility of different wells in each of the groups being in various phases without regard to when the first cycle for each well was started. More than one well in a group can be in the same phase. With this method the life cycle of a group of multiple wells and, optional, several groups of wells, can be continuously monitored and adjusted to maintain a desired pressure and temperature for each of the wells, using the carbon dioxide recaptured from the various wells, thus reducing or eliminating any need to purchase or obtain additional carbon dioxide.

Additionally, these methods allow for capture and reuse of carbon dioxide between wells using a method and apparatus like the one (but not limited to the one) described in FIG. 9. An initial amount, purchased, from storage, or perhaps obtained from the air, is used to start the cycle in the first well in each group, and possibly also part of a second well or perhaps one or more additional wells. Once production is started in the first well, the carbon dioxide that is recovered can be used to inject as part of Phase 1 into another well in the group or perhaps into a well in another group. As previously mentioned, the recapture carbon dioxide can also be used during Phase 3 for lift not only the well from which it is being recovered but also for lift in Phase 3 in other wells. The method has the benefit of enabling sequestration of the initial carbon dioxide and possibly also, in the case of the embodiment of FIG. 10, taking carbon dioxide out of the air.

The embodiments described above are intended to be representative and non-limiting. They can be modified without departing from the invention as defined by the appended claims.

In the preceding description—

The terms "comprising" and "including" are intended to signal a non-exclusive listing; the referenced item may have other features, components, or characteristics not listed or identified;

A reference to something being "exemplary" or an "example" should be understood to mean that it is non-exclusive example;

The terms "about" or "approximately" or the like, when used with a number, may mean that specific number, or alternatively, a range in proximity to the specific number, as understood by persons of skill in the art field (for example, +/−10%); and The terms "may," "can," "could," "should," "would," "preferably," "possibly," "typically," "optionally," "for example," "often," or "might" (or other such language) are intended to signal that a component, feature, characteristic or result is optional, not required, and thus can be omitted, replaced or modified in alternative embodiments.

What is claimed is:

1. A method for enhancing oil recovery from a well, comprising:
    pressurizing a closed well by injecting a gas into the well;
    allowing the pressurized well to soak;
    opening the well to a production flow;
    converting geothermal energy stored the production flow to electrical power with a low temperature geothermal (LTG) electric generator
    recapturing at least some of the gas injected into the well to pressurize the well from the production stream; and
    powering the recapturing of at least some of the gas with electrical power converted by the LTG electric generator from geothermal energy stored in the production flow from the well or another well.

2. A method for enhancing oil recovery from a well, comprising:
    pressurizing a closed well by injecting a gas into the well;
    allowing the pressurized well to soak;
    opening the well to production flow;
    converting geothermal energy stored in the production flow to electrical power;
    recapturing at least some of the gas injected into the well to pressurize the well from the production stream;
    injecting the recaptured gas into the well or into another well;
    wherein the injected gas is comprised of carbon dioxide and the production flow is comprised of a liquid phase containing oil and a gas phase containing the injected carbide dioxide and natural gas, and wherein separating the injected gas from the production stream comprises separating the injected carbon dioxide from the production stream by a process comprising separating the gas phase from the production stream to create a gas stream and oxidizing the natural gas in the gas stream to remove it.

3. The method of claim 2, wherein the injected carbon dioxide separated by from the injection stream is reinjected into the well to create lift for the production flow or to pressurize the well.

4. The method of claim 2, wherein the injected carbon dioxide separated by from the injection stream is reinjected into another well to create lift for the production flow or to pressurize the well.

5. The method of claim 2, wherein the oxidizing the natural gas heats the carbon dioxide in the gas stream, and wherein the thermal energy in the carbon dioxide is converted to electrical power.

6. The method of claim 2, wherein oxidizing of the natural gas in the gas stream comprises feeding the gas stream into an Allam cycle generator to produce electricity and a carbon dioxide stream.

7. The method of claim 6, wherein the Allam cycle generator receives a stream of carbon dioxide and oxygen created by a cryogenerator.

8. A method comprising:
    injecting into a first well in a group of two or more wells a gas to pressurize the well;
    after pressurizing the first well, opening the first well and separating from a first production flow from the first well at least some of the gas injected into the well;
    pressurizing a second well in the group of wells, pressuring comprising injecting at least some of gas injected into the first well and separated from the production flow from the first well while the production flow is flowing from the first well;
    after pressurization, opening the second well and separating from a second production flow from the second well at least some of the gas injected into the second well;
    monitoring the pressure of each well in the group of two or more wells and pressuring the well if the pressure falls below a predetermined threshold, wherein pressuring comprises injecting at least some of the gas separated from the first or second production streams.

9. The method of claim 8, wherein the gas is comprised of carbon dioxide.

10. The method of claim 8, wherein the rejection of the gas into the second well pressurizes the well.

11. The method of claim 8, wherein the reinjection of the gas into the second well creates lift for a production flow in the second well.

12. The method of claim 8, wherein gas reinjected into the second well is at least partially recaptured from a production flow from the second well.

13. The method of claim 12, wherein gas recaptured from the second well is reinjected into the second well to provide lift to the production flow from the second well.

14. The method of claim 12, wherein the gas recaptured from the second well is reinjected into a third well in the group of wells to pressurize the well or to lift a production flow from the third well.

15. The method of claim 12, further comprising converting geothermal energy stored in the production streams from the first well and the second well to electrical power.

16. The method of claim 15, wherein the electrical power powers at least in part the separating of the gas from the production flows from the first and second wells.

17. The method of claim 15, wherein a centrally located geothermal station receives geothermal energy from production streams of each of the wells in the group wells and converts it to electrical power.

18. A method, comprising:
pressurizing a closed well by injecting a gas into the well;
allowing the pressurized well to soak;
opening the well to a production flow;
converting geothermal energy stored in the production flow to electrical power by heating a working fluid of a low temperature geothermal (LTG) electric generator with the production flow;
recapturing at least some of the gas injected into the well from the production stream; and
powering the recapturing of at least some of the gas with electrical power converted by the LTG electric generator from geothermal energy stored in the production flow from the well or another well.

19. The method of claim 18, further comprising injecting the recaptured gas into the well to pressurize the well.

20. The method of claim 18, further comprising injecting the recaptured gas into another well to pressurize the well.

21. The method of claim 18, further comprising injecting the recaptured gas into the well or another well to create lift for production flow.

22. The method of claim 18, wherein the well is part of a group of wells, and wherein the method further comprises injecting the recaptured gas into two or more of the wells in the group of wells.

23. The method of claim 22, wherein the recaptured gas is injected into each of the two or more wells to create lift for production flow or to pressurize the well.

24. The method of claim 18, wherein the recapturing at least some of the gas comprises separating the gas from the production steam.

* * * * *